(12) United States Patent
Endo et al.

(10) Patent No.: US 8,024,843 B2
(45) Date of Patent: Sep. 27, 2011

(54) BIAXIAL HINGE DEVICE AND PORTABLE TERMINAL DEVICE

(75) Inventors: Isao Endo, Kanagawa (JP); Tsutomu Takahashi, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 286 days.

(21) Appl. No.: 12/399,226

(22) Filed: Mar. 6, 2009

(65) Prior Publication Data

US 2009/0223021 A1 Sep. 10, 2009

(30) Foreign Application Priority Data

Mar. 7, 2008 (JP) ................................ P2008-057790
Jan. 22, 2009 (JP) ................................ P2009-012417

(51) Int. Cl.
*E05D 3/10* (2006.01)
(52) U.S. Cl. ......... 16/367; 16/303; 16/330; 361/679.07; 455/575.3; 379/433.13; 248/923
(58) Field of Classification Search .............. 16/367, 16/302, 282, 294, 330, 303; 361/679.07, 361/679.27; 455/575.3; 379/433.13; 248/923
See application file for complete search history.

(56) References Cited

U.S. PATENT DOCUMENTS

| 6,839,576 | B2 * | 1/2005 | Aagaard et al. | 455/575.1 |
| 7,034,755 | B2 * | 4/2006 | Takagi | 343/702 |
| 7,844,050 | B2 * | 11/2010 | Hwang et al. | 379/433.13 |
| 2007/0123319 | A1 * | 5/2007 | Hwang | 455/575.1 |
| 2009/0235487 | A1 * | 9/2009 | Endo et al. | 16/243 |
| 2010/0005627 | A1 * | 1/2010 | Endo et al. | 16/367 |

FOREIGN PATENT DOCUMENTS

JP 2005 198062 7/2005

* cited by examiner

*Primary Examiner* — Wiliam L. Miller
(74) *Attorney, Agent, or Firm* — Frommer Lawrence & Haug LLP; William S. Frommer; Ellen Marcie Emas

(57) ABSTRACT

A biaxial hinge device includes an approximately rod-shaped first shaft member; an approximately rod-shaped second shaft member; a shaft connecting member for connecting the first shaft member and the second shaft member such that the direction in which the first shaft member extends and the direction in which the second shaft member extends are approximately orthogonal; an arm portion provided to the first shaft member so as to be turnable along the outer circumference of the first shaft member, a hinge fixing portion provided to the second shaft member so as to be turnable along the outer circumference of the second shaft member, and a thrust cam member provided to the first shaft member such that movement in the direction in which the first shaft member extends is enabled.

10 Claims, 23 Drawing Sheets

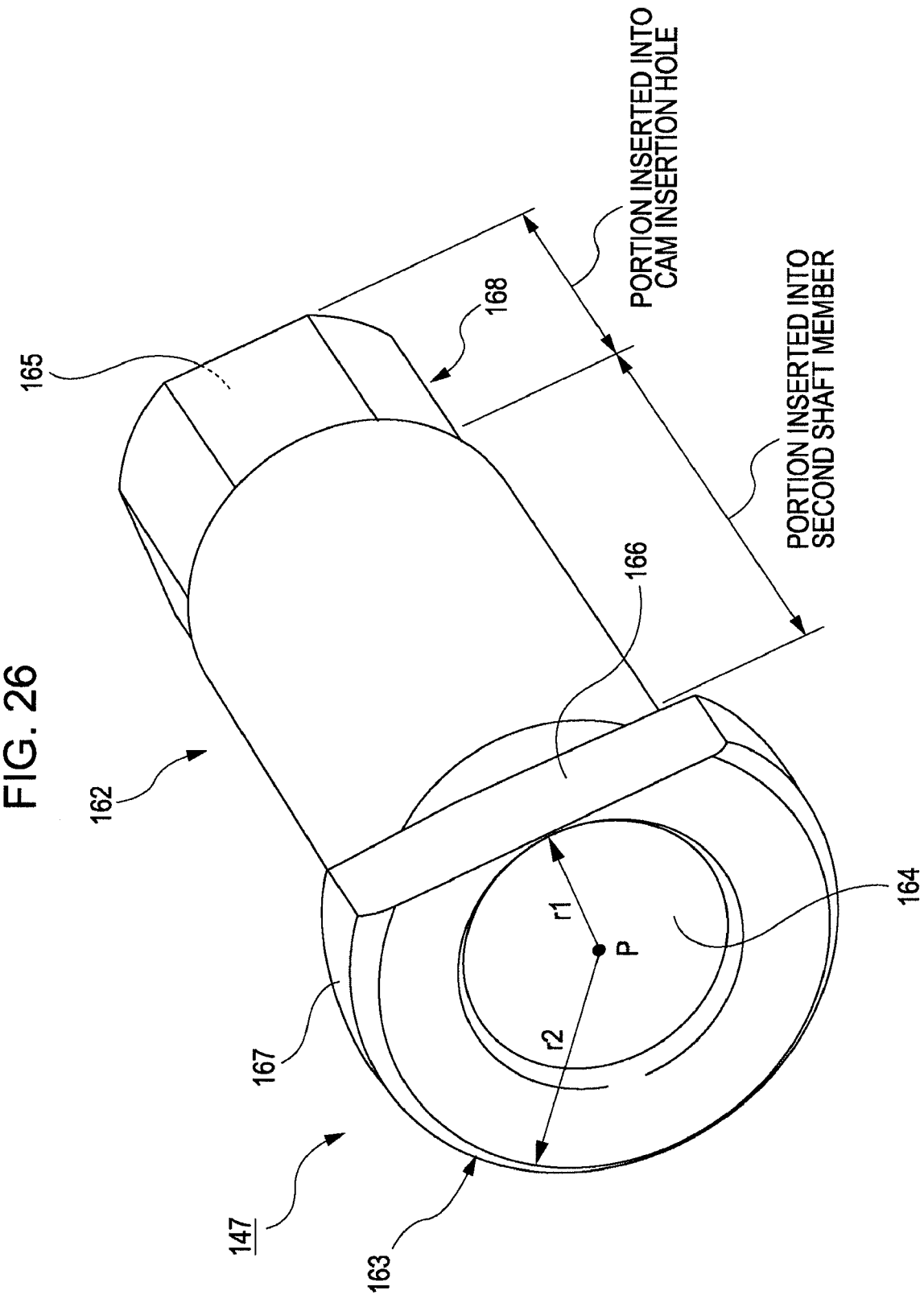

BIAXIAL HINGE DEVICE AND PORTABLE TERMINAL DEVICE

BACKGROUND OF THE INVENTION

1. Field of the Invention

The present invention relates to a biaxial hinge device suitably applied to cellular telephone devices, PHS (Personal Handyphone System) telephone devices, PDA (Personal Digital Assistant) devices, portable game devices, notebook computers, and so forth, which have a hinge portion enabling opening/closing of a housing, for example, and to a portable terminal device. More particularly, the present invention relates to a biaxial hinge device having two rotational axes and to a portable terminal device wherein the overall size and the like has been reduced by enabling a single spring member to serve in the place of spring members used for each rotational shaft with the related art, thereby reducing the number of spring members.

2. Description of the Related Art

Japanese Unexamined Patent Application Publication No. 2005-198062 (pp. 8-9, FIG. 5) discloses in a clamshell type cellular telephone device having three folding functions which are a function of opening/closing in the longitudinal direction of an upper housing, a function of opening/closing in the lateral direction, and a function of folding in a state of the front and back of the upper housing having been inverted.

This clamshell type cellular telephone device has a hinge unit configured separately of a first hinge unit and a second hinge unit. The first hinge unit has a first rotational shaft rotatably supporting the first hinge unit itself as to a lower housing, and a second rotational shaft rotatably supporting the second hinge unit as to the first hinge unit, with the first rotational shaft and the second rotational shaft disposed in a mutually orthogonal arrangement. The second hinge unit is provided with a third rotational shaft which rotationally supports the upper housing as to the second hinge unit, such that the second rotational shaft is disposed orthogonal to the second rotational shaft. Accordingly, the upper housing can be rotated on each of the rotational shaft directions of the first rotational shaft, second rotational shaft, and third rotational shaft.

SUMMARY OF THE INVENTION

However, hinge devices having multiple mutually orthogonal rotational shafts, as with the case of the hinge units provided in the clamshell type cellular telephone device disclosed in Japanese Unexamined Patent Application Publication No. 2005-198062, have used spring members for pressing rotation restricting cams along each rotational shaft. In other words, in the case of a biaxial hinge device enabling both longitudinal and lateral opening of the upper housing, a spring member for restricting longitudinal opening along a longitudinal opening rotational shaft for pressing a longitudinal opening restricting cam, and a spring member for restricting lateral opening along a lateral opening rotational shaft for pressing a lateral opening restricting cam, both have been used. To rephrase, with the related art, the number of springs used has been the same as the number of rotational axes. This leads to more space being used to store the multiple springs as a matter of course, resulting in a large size of the hinge device itself, and this has been a problem in reduction in size and the like of the devices using such hinge devices.

It has been found desirable to provide a biaxial hinge device and a portable terminal device, realizing contribution to reduction in size by enabling a single spring member to serve in the place of spring members used for each of the two rotational axes with the related art, thereby reducing the number of spring members, and ultimately the size of the device itself.

According to an embodiment of the present invention, a biaxial hinge device includes: an approximately rod-shaped first shaft member; an approximately rod-shaped second shaft member; a shaft connecting member for connecting the first shaft member and the second shaft member such that the direction in which the first shaft member extends and the direction in which the second shaft member extends are approximately orthogonal; an arm portion provided to the first shaft member so as to be turnable along the outer circumference of the first shaft member, the arm portion further including a fixing portion for fixation to a first housing, and a fitting recess provided along the direction in which the first shaft member extends; a hinge fixing portion for fixation to a second housing, provided to the second shaft member so as to be turnable along the outer circumference of the second shaft member; a thrust cam member provided to the first shaft member such that movement in the direction in which the first shaft member extends is enabled, the thrust cam member further including a fitting protrusion, provided at the end portion thereof toward the arm portion, for fitting into the fitting recess of the arm portion; a spring member configured to press the thrust cam member in the direction of the second shaft member; and a thrust cam motion control member including a first contact face portion, for moving the thrust cam member in the direction of the connecting portion between the first shaft member and the second shaft member; and a second contact face portion, for moving the thrust cam member in the direction of the arm portion, such motion taking place by the first contact face portion and the second contact face portion directly or indirectly coming into contact as to the thrust cam; wherein, in the event that the first housing and the second housing are in a closed state, the thrust cam member is moved in the direction of connection between the shift shaft member and the second shaft member according to pressing force by the spring member with the first contact face portion, and fitting protrusion portions of the thrust cam member and fitting recess portions of the arm portion are disengaged from fitting, whereby the each housing can turn supported by the first shaft member as a rotational shaft and together the each housing can turn supported by the second shaft member as a rotational shaft, and in a case of turning supported by the second shaft member as a rotational shaft, the thrust cam member is moved in the direction of the arm portion so as to press against the pressing force of the spring member, whereby the fitting protrusion portions of the thrust cam member are fitted into the fitting recesses of the arm portion, and the turning angle of the each housing supported by the second shaft member as a rotational shaft is restricted to a predetermined turning angle.

According to an embodiment of the present invention, a portable terminal device includes: a first housing; a second housing; a biaxial hinge device including a rotational shaft, by which the first housing and the second housing are connected so as to enable opening in a longitudinal direction and a lateral direction, such that the first housing and second housing can be approximately orthogonal to one another, the biaxial hinge device further including an approximately rod-shaped first shaft member, an approximately rod-shaped second shaft member, a shaft connecting member for connecting the first shaft member and the second shaft member such that the direction in which the first shaft member extends and the direction in which the second shaft member extends are approximately orthogonal, an arm portion provided to the first shaft member so as to be turnable along the outer circumference of the first shaft member, the arm portion further including a fixing portion for fixation to the first housing, and a fitting recess provided along the direction in which the first shaft member extends; a hinge fixing portion for fixation to the second housing, provided to the second shaft member so as to be turnable along the outer circumference of the second shaft member; a thrust cam member provided to the first shaft member such that movement in the direction in which the first shaft member extends is enabled, the thrust cam member further including a fitting protrusion, provided at the end portion thereof toward the arm portion, for fitting into the fitting recess of the arm portion; a spring member configured to press the thrust cam member in the direction of the second shaft member; and a thrust cam motion control member including a first contact face portion, for moving the thrust cam member in the direction of the connecting portion between the first shaft member and the second shaft member; and a second contact face portion, for moving the thrust cam member in the direction of the arm portion, such motion taking place by the first contact face portion and the second contact face portion directly or indirectly coming into contact as to the thrust cam; wherein, in the event that the first housing and the second housing are in a closed state, the thrust cam member is moved in the direction of connection between the shift shaft member and the second shaft member according to pressing force by the spring member with the first contact face portion, and fitting protrusion portions of the thrust cam member and fitting recess portions of the arm portion are disengaged from fitting, whereby the each housing can turn supported by the first shaft member as a rotational shaft and together the each housing can turn supported by the second shaft member as a rotational shaft, and in a case of turning supported by the second shaft member as a rotational shaft, the thrust cam member is moved in the direction of the arm portion so as to press against the pressing force of the spring member, whereby the fitting protrusion portions of the thrust cam member are fitted into the fitting recesses of the arm portion, and the turning angle of the each housing supported by the second shaft member as a rotational shaft is restricted to a predetermined turning angle.

The above configurations according to an embodiment of the present invention use one spring member for the spring members which were necessary for each of the rotational position restrictions for each of the two rotational shafts, thereby reducing the design space for the spring member to only a design space for one spring worth of a spring member, whereby the biaxial hinge device can be miniaturized, and the device providing the biaxial hinge device can be miniaturized.

The above configurations according to an embodiment of the present invention enables rotational position restrictions for each rotational shaft with one spring member. Thus, the design space for the spring member can be reduced to only a design space for one spring worth of a spring member, whereby the biaxial hinge device can be miniaturized, and the device providing the biaxial hinge device can be miniaturized.

BRIEF DESCRIPTION OF THE DRAWINGS

FIG. 26 is a perspective view of a slide control cam provided to the biaxial hinge portion of the cellular telephone device according to the second embodiment.

DESCRIPTION OF THE PREFERRED EMBODIMENTS

The present invention can be applied to a clamshell type cellular telephone device which enables longitudinal opening and lateral opening of a housing.

First Embodiment

Configuration of Portable Telephone Device of First Embodiment

Figure 1:
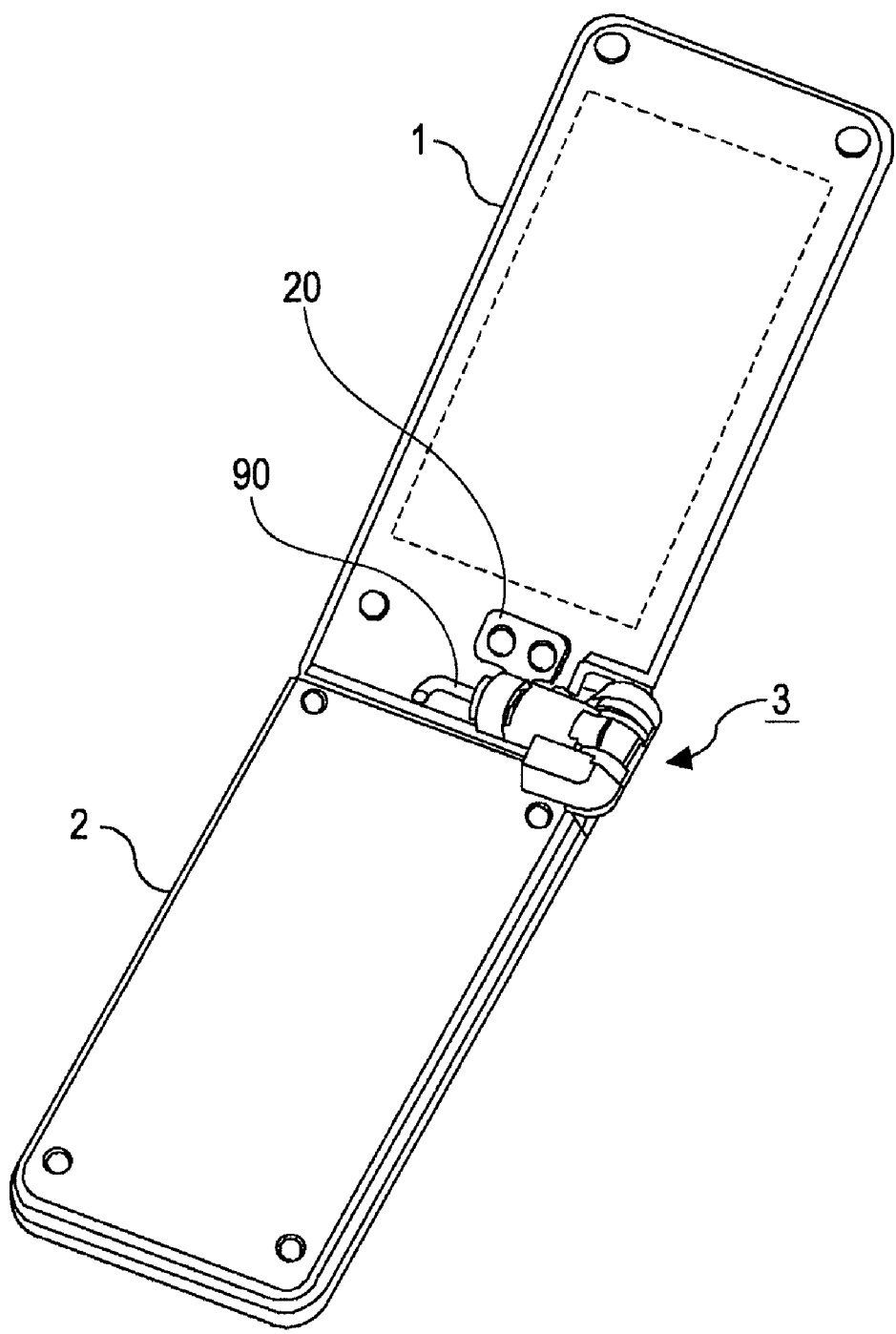
FIG. 1 is a perspective view of a cellular telephone device to which a first embodiment of the present invention has been applied, in a longitudinally-opened state.
Figure 2:
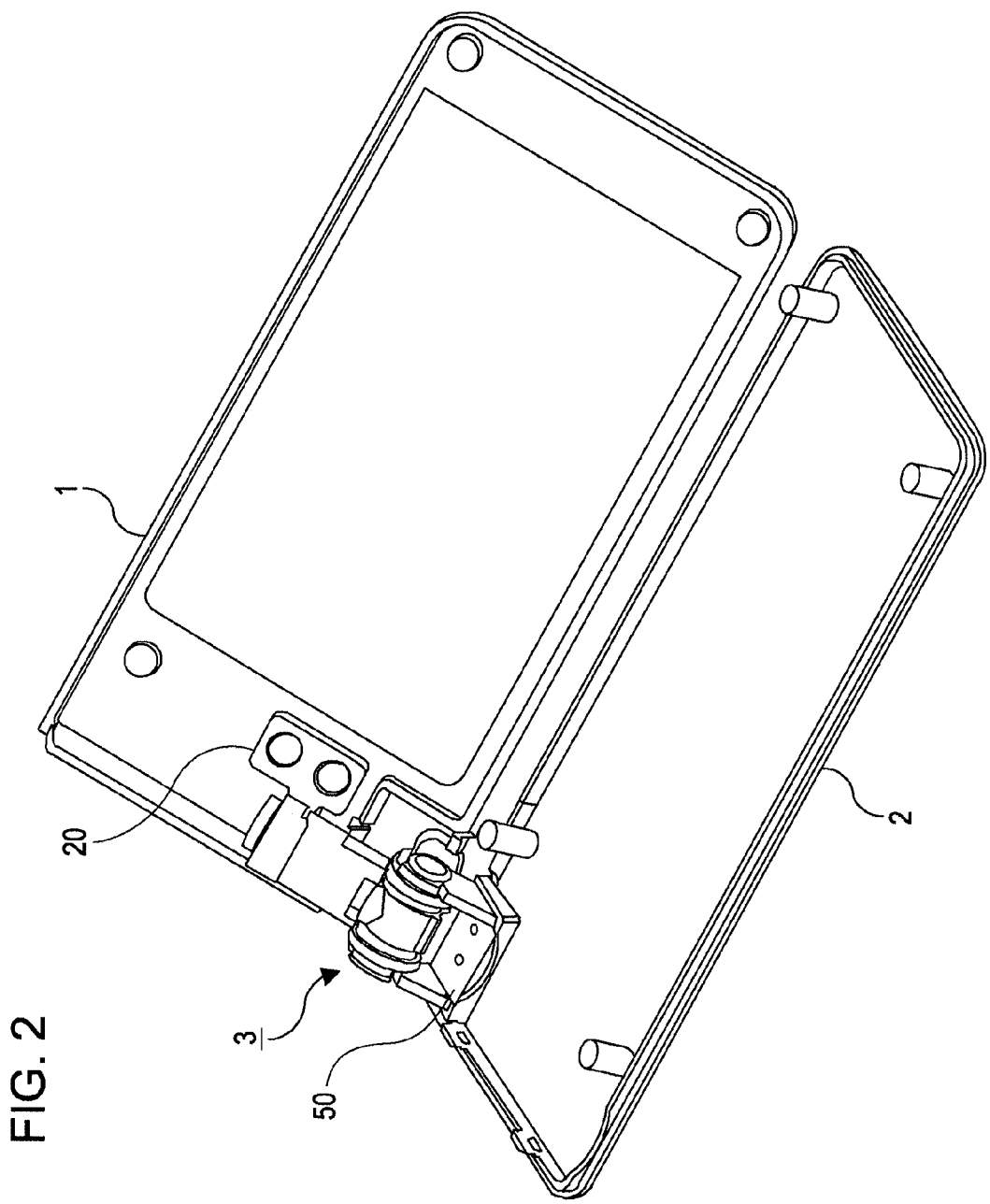
FIG. 2 is a perspective view of the cellular telephone device according to the first embodiment, in a laterally-opened state.

FIG. 1 is a perspective view of a cellular telephone device to which a first embodiment of the present invention has been applied, in a longitudinally-opened state, and FIG. 2 is a perspective view of the cellular telephone device, in a laterally-opened state. As shown in FIGS. 1 and 2, the cellular telephone device according to the first embodiment has an upper housing 1 in which is provided a display unit such as a liquid crystal display unit or organic EL (Electro Luminescence) display unit, a lower housing 2 where operating units such as rotational operation keys and numerical keys and the like are disposed, and a biaxial hinge portion 3 enabling the upper housing 1 and the lower housing 2 to be opened/closed longitudinally to a longitudinally opened state and laterally to a laterally opened state on approximately orthogonal rotational axes.

Configuration of Biaxial Hinge Portion

Figure 3:
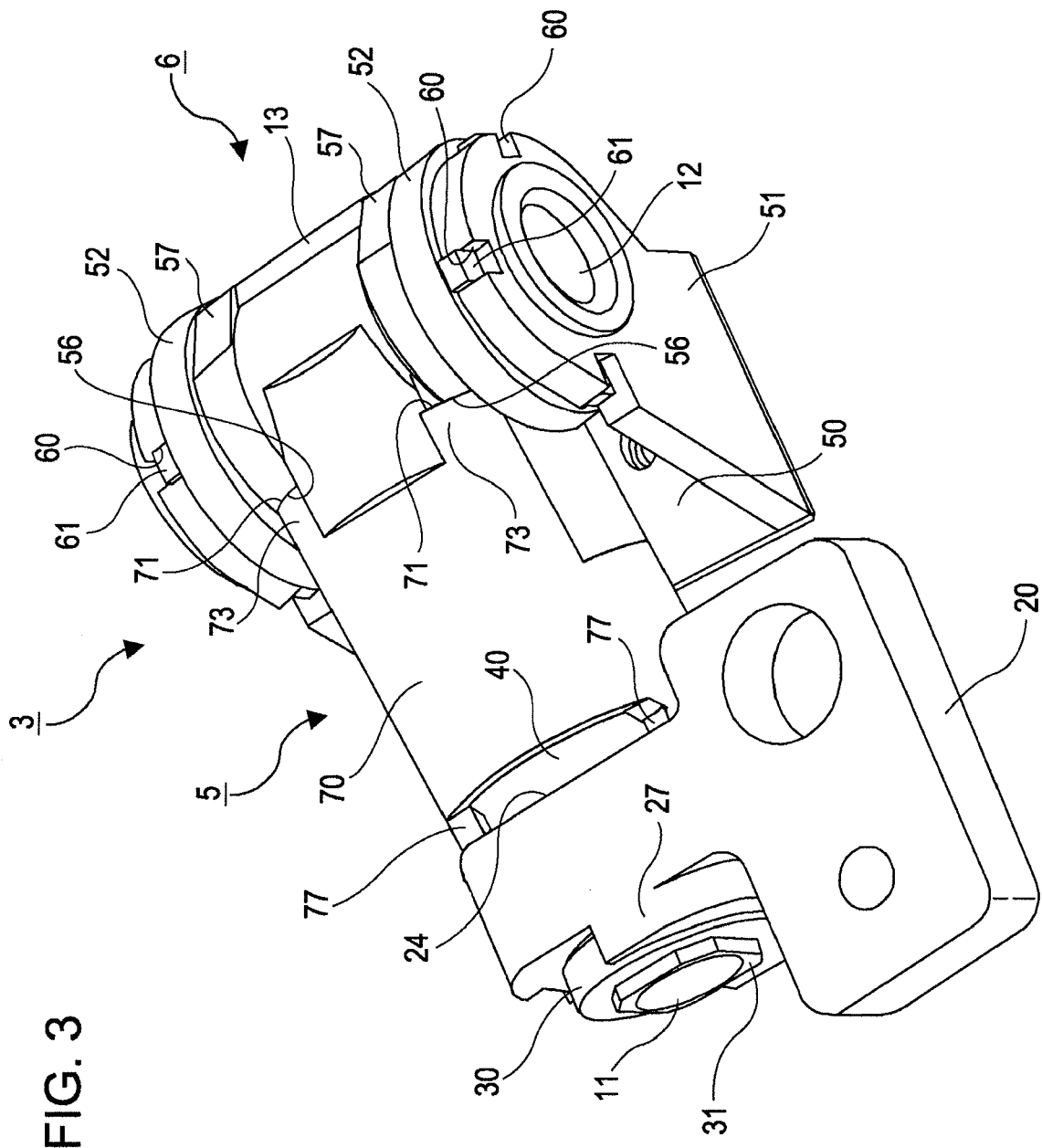
FIG. 3 is a perspective view of a biaxial hinge portion provided to the cellular telephone device according to the first embodiment.

The biaxial hinge portion 3 has a longitudinal opening mechanism 5 which includes a first shaft member 11 which is a generally rod-shaped member as shown in FIG. 3, a lateral opening mechanism 6 having a second shaft member 12 which is a generally rod-shaped member that is somewhat shorter than the first shaft member 11, and the like, and a shaft connecting member 13 for connecting the longitudinal opening mechanism 5 and the lateral opening mechanism 6 by connecting the first shaft member 11 and the second shaft member 12 to each other such that the axial direction of the first shaft member 11 (i.e., the longitudinal direction thereof) and the axial direction of the second shaft member 12 (i.e., the longitudinal direction thereof) are generally orthogonal, or more specifically, are in a generally T-shaped arrangement.

Configuration of Longitudinal Opening Mechanism
(Configuration of First Shaft Member)

Figure 4:
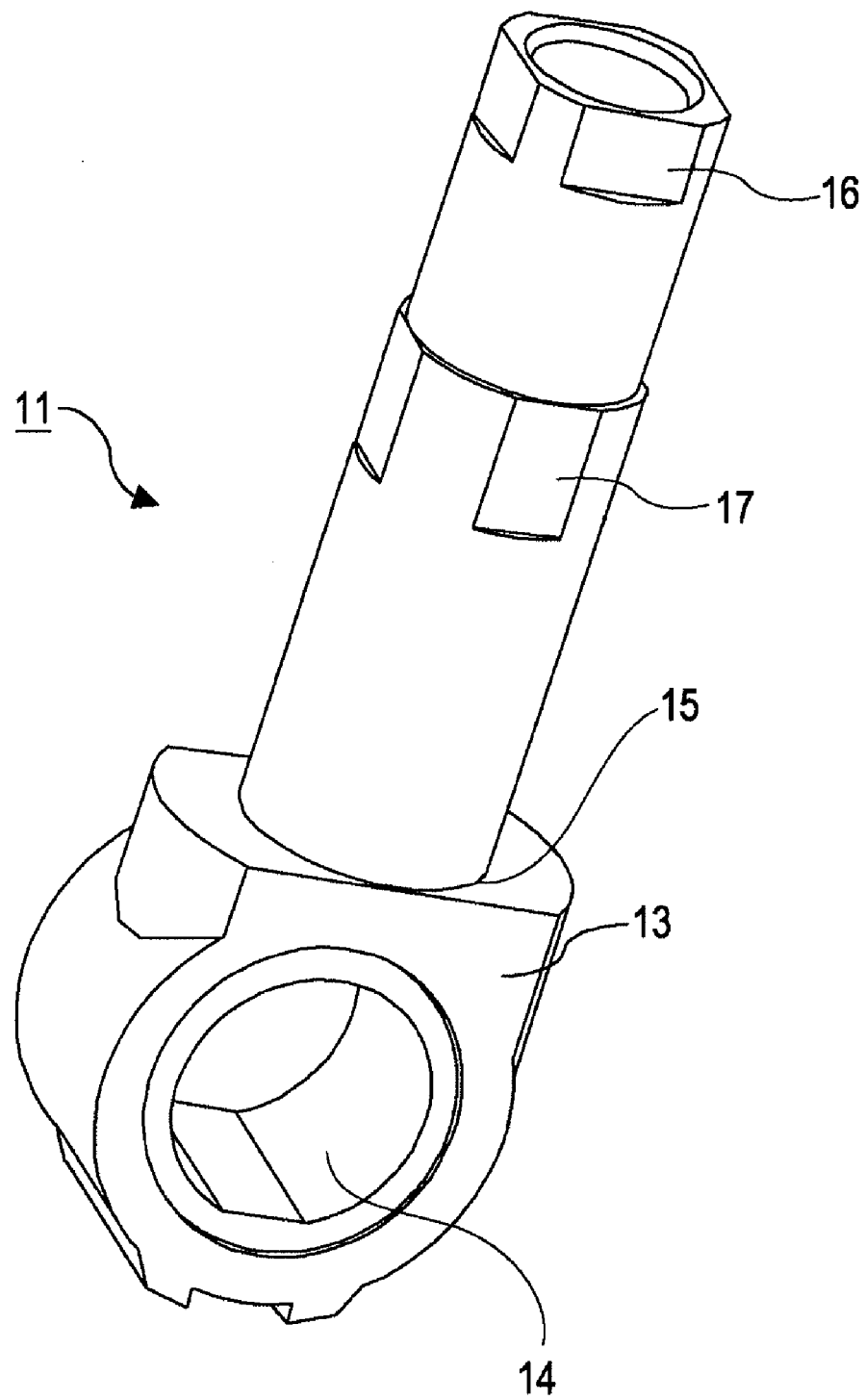
FIG. 4 is a perspective view of a first shaft member provided to the biaxial hinge portion.

The first shaft member 11 provided to the longitudinal opening mechanism 5 is made of a metallic member such as stainless steel, iron, aluminum or the like and a hard plastic member such as ABS resin or the like, for example, and serves as a rotational shaft at the time of opening the cellular telephone device to the longitudinal opened state shown in FIG. 1. FIG. 4 is a perspective view of the first shaft member 11 and shaft connecting member 13. As can be understood from FIG. 4, the first shaft member 11 and the shaft connecting member 13 are formed integrally in the case of the biaxial hinge portion 3 of the portable telephone device according to the present embodiment. More specifically, the shaft connecting member 13 has a relatively short generally cylindrical shape made of a metallic member such as stainless steel, iron, aluminum or the like and a hard plastic member such as ABS resin or the like, for example, with an insertion hole portion 14 provided into which the second shaft member 12 is inserted, and a connection portion 15 on the perimeter thereof. The first shaft member 11 and the shaft connecting member 13 are integrally formed with the other end portion of the first shaft member 11 connecting to the connection portion 15.

Note that while description will proceed with regard to an arrangement wherein the first shaft member 11 and the shaft connecting member 13 are integrally formed, but an arrangement may be made wherein the first shaft member 11 and the shaft connecting member 13 are each provided as separate parts, with the other end portion of the first shaft member 11 being inserted and connected to the connection portion 15 of the shaft connecting member 13. In this case, the first shaft member 11 and the shaft connecting member 13 can be integrally formed (connected) by cutting screw threads on the first shaft member 11 and also forming a screw hole in the shaft connecting member 13, such that the portion of the first shaft member 11 with screw threads cut is screwed into the screw hole of the shaft connecting member 13.

Also, though not shown in the drawings, the second shaft member 12 has been subjected to so-called D-cutting, where the radial cross-sectional form is a D-shape. Accordingly, the insertion hole portion 14 of the shaft connecting member 13, where this second shaft member 12 is to be inserted is bored, is formed in a general D-shape such that the radial cross-sectional form matches that of the second shaft member 12. Accordingly, inserting the second shaft member 12 into the insertion hole portion 14 of the shaft connecting member 13 enables the second shaft member 12 to be supported by the shaft connecting member 13 with turning in the circumferential direction restricted, i.e., fixed so as to not turn within the insertion hole portion 14.

Also, the first shaft member 11 has an overall generally cylindrical shape, but shapes for restricting turning of the part in the circumferential direction have been formed near the one end portion, which is the opposite end portion as to the other end portion connected to the connection portion 15 of the shaft connecting member 13, and at a position around the middle in the longitudinal direction. While these will be described in later, a washer stopper retaining portion 16 where a washer stopper (reference numeral 30 in FIG. 3) is to be provided is formed near the one end portion of the first shaft member 11, and an arm cam member retaining member 17 where an arm cam member (reference numeral 40 in FIG. 3) is to be provided is formed around the middle in the longitudinal direction.

Configuration of Arm Portion

Figure 5:
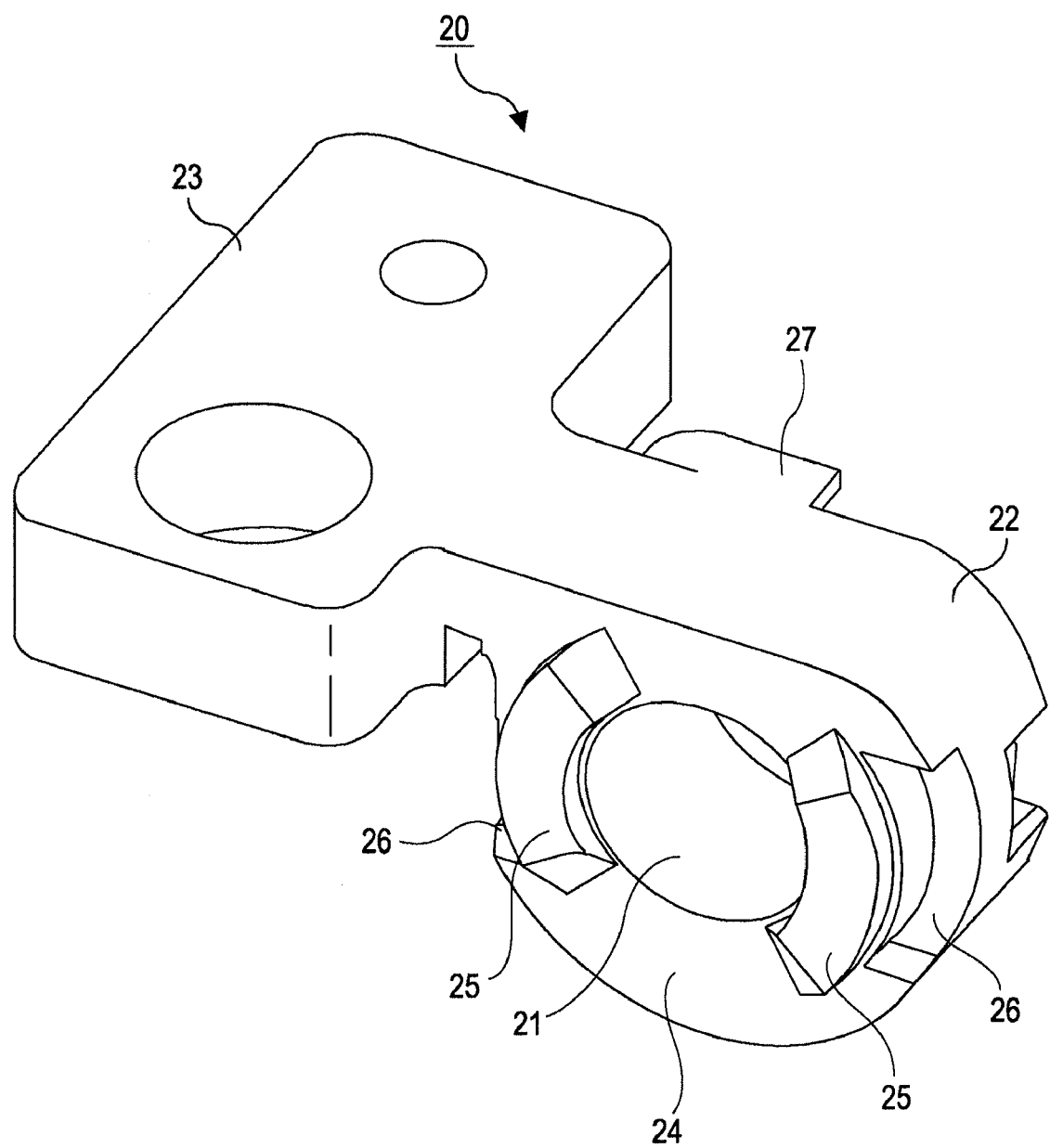
FIG. 5 is a perspective view of an arm portion provided to the biaxial hinge portion.

Further, an arm portion 20 arranged so as to be turnable along the outer circumference of the first shaft member 11 is provided near the one end portion opposite to the shaft connecting member 13. FIG. 5 shows a perspective view of the arm portion 20. As can be seen from FIG. 5, the arm portion 20 has a generally cylindrical cam portion 22 with a shaft insertion hole 21 through which the first shaft member 11 is inserted, and a fixing portion 23 in an elongated plate shape or fixation of the arm portion 20 to the upper housing 1 by a screw member or the like. The cam portion 22 and the fixing portion 23 are integrally formed by connecting a part of the perimeter of the cam portion 22 to one side face portion of the fixing portion 23 in the longitudinal direction thereof.

One end face of the arm portion 20 is a cam face 24 which comes into contact with a later-described arm cam member, with a pair of fitting protrusions 25 formed on this cam face 24 so as to generally face one another across the shaft insertion hole 21. Upon the arm portion 20 reaching a predetermined rotational position, the pair of fitting protrusions 25 fit into fitting recesses provided to the arm cam member, thereby restricting the rotational position of the arm 20.

Figure 6:
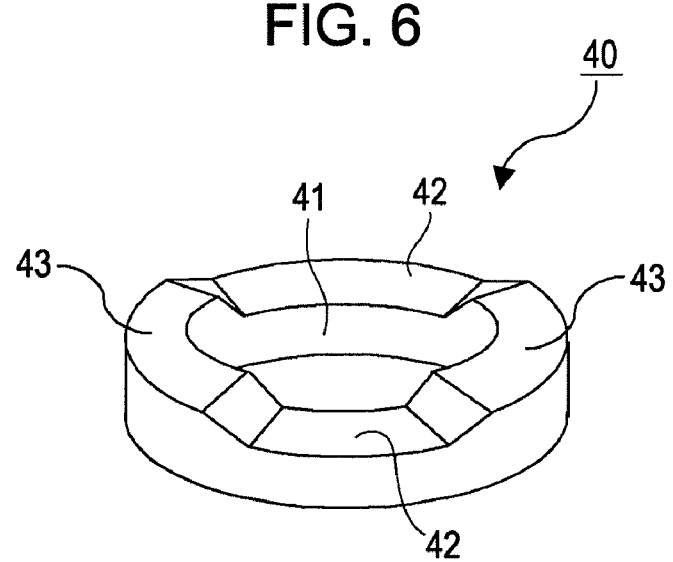
FIG. 6 is a perspective view of an arm cam member for the arm portion, provided to the biaxial hinge portion.

FIG. 6 illustrates a perspective view of an arm cam member 40. As can be seen from FIG. 6, the arm cam member 40 is formed having a general ring shape, having an insertion hole 41 where the first shaft member 11 is to be inserted. This insertion hole 41 is formed so as to have a shape capable of being retained by the above-described arm cam member retaining member 17 of the first shaft member 11. Accordingly, upon inserting the first shaft member 11 into the insertion hole 41, the arm cam member 40 is fixedly provided to the first shaft member 11, in a state wherein the turning of the first shaft member 11 in the circumferential direction has been restricted.

Also, the face side of the arm cam member 40 facing the cam face 24 of the arm portion 20 is provided with a pair of fitting recesses 42. Upon the arm portion 20 reaching a predetermined rotational position, the pair of fitting protrusions 25 fit into the fitting recesses 42 of the arm cam member 40, thereby restricting the rotational position of the arm 20 at the predetermined rotational position.

Note that, as can be seen in FIG. 5, both end portions of the fitting protrusions 25 of the arm portion 20 are tapered so as to gradually rise up from the cam face 24 to the fitting protrusions 25. Also, as can be seen in FIG. 6, both end portions of the fitting recesses 42 of the arm cam member 40 are tapered so as to gradually rise up from the fitting recesses 42 to the end portion of the arm cam member 40. The tapering formed on the arm portion 20 and the arm cam member 40 enables engaging and disengaging of the fitting protrusions 25 and the fitting recesses 42 to be performed smoothly while providing the user with a suitable sense of operation (i.e., a clicking sensation).

Returning to description of the arm portion 20 shown in FIG. 5, the arm portion 20 has a pair of fitting recesses 26 provided so as to extend the outer circumferential faces of the fitting protrusions 25 in a direction generally extending orthogonal to the radial direction of the shaft insertion hole 21. Into the fitting recesses 26 are fit fitting protrusions (reference numeral 77 in FIG. 8) of a later-described thrust cam.

Also, formed on the other end face of the arm portion 20 is a stopper 27 for stopping the turning of the arm portion 20 by coming into contact with the later-described washer stopper (reference numeral 30 in FIG. 30) upon the rotational position of the arm portion 20 reaching a predetermined rotational position.

This arm portion 20 has arranged to be situated between the washer stopper retaining portion 16 and arm cam member retaining member 17 shown in FIG. 4, by having the first shaft member 11 inserted into the shaft insertion hole 21.

As can be seen from FIG. 4, there is no formation between the washer stopper retaining portion 16 and arm cam member retaining member 17 of the first shaft member 11 which would restrict a part provided to the first shaft member 11 from turning in the circumferential direction. Accordingly, the arm portion 20 provided between the washer stopper retaining portion 16 and the arm cam member retaining member 17 of the first shaft member 11 is turnable along the circumferential direction of the first shaft member 11. The washer stopper 30 is provided to the washer stopper retaining portion 16 of the first shaft member 11 as shown in FIG. 3 with the arm portion 20 provided to the first shaft member 11 in such a state, whereby the arm portion 20 is capable of being provided to the first shaft member 11 turnably without falling off.

Configuration of Lateral Opening Mechanism

Next, the lateral opening mechanism 6 is configured so as to turnably support the second shaft member 12 which serves as a rotational shaft at the time of laterally opening the cellular telephone device as shown in FIG. 2, by way of a hinge fixing portion 51 shown in FIG. 3. This hinge fixing portion 51 is screwed to the lower housing 2 by way of a fixing portion 50. Note that the second shaft member 12 is made of a metallic member such as stainless steel, iron, aluminum or the like and a hard plastic member such as ABS resin or the like, for example.

Configuration of Rotation Restricting Cam Member

Figure 7:
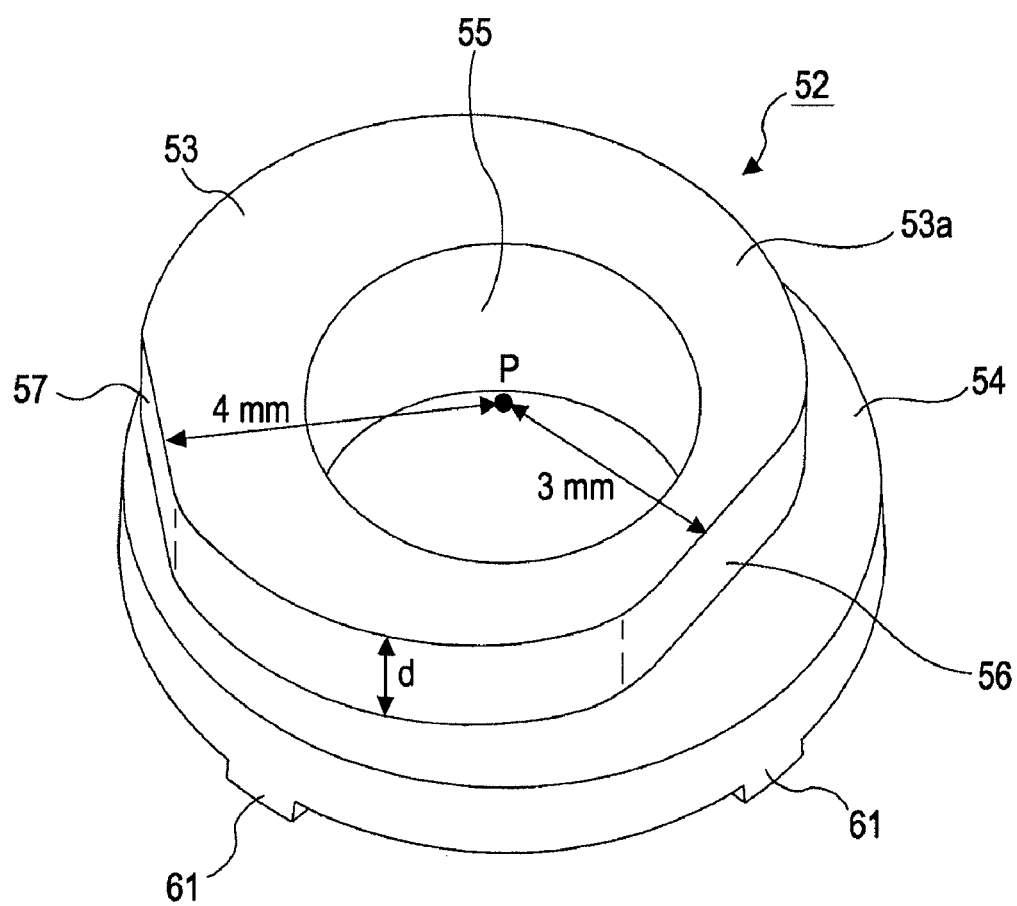
FIG. 7 is a perspective view of rotation restricting cam member provided to the biaxial hinge portion.

A pair of rotation restricting cam members 52 are provided to the second shaft member 12 across the shaft connecting member 13 as shown in FIG. 3. FIG. 7 shows a perspective view of the rotation restricting cam member 52. As can be seen from FIG. 7, the rotation restricting cam member 52 has a form wherein a small-diameter ring-shaped member 53 and a large-diameter ring-shaped member 54 are concentrically layered and formed integrally, with an insertion hole 55 for insertion of the second shaft member 12 being formed at the center, communicating the ring-shaped members 53 and 54.

Observing the ring-shaped member 54, at the face opposite to the face on which the small-diameter ring-shaped member 53 has been formed, there are provided multiple claws 61 for fitting into multiple retaining grooves 60 formed on the hinge fixing portion 51 shown in FIG. 3.

Also, the small-diameter ring-shaped member 53 has formed, on two locations on the outer circumferential face thereof, a first contact face portion 56 and a second contact face portion 57, formed by cutting off the ring-shaped member 53 from an end face 53a thereof down to the ring-shaped member 54. The first contact face portion 56 and the second contact face portion 57 are provided such that the thickness of the ring-shaped member 53 in the radial direction, i.e., the distance from the outer circumference of the insertion hole 55 to the outer circumference of the ring-shaped member 53, changes.

In other words, the first contact face portion 56 is formed such that the distance from the center P of the rotation restricting cam member 52 to the outer circumference of the ring-shaped member 53 is 3 mm for example, and the second contact face portion 57 is formed such that the distance from the center P of the rotation restricting cam member 52 to the outer circumference of the ring-shaped member 53 is 4 mm for example.

While described later, the first contact face portion 56 forms a face portion coming in contact with a contact face portion 71 of a thrust cam 70 shown in FIG. 3 in the state that the upper housing 1 and lower housing 2 are closed, and the second contact face portion 57 forms a face portion coming in contact with the contact face portion 71 of the thrust cam 70 at the time of laterally opening the cellular telephone device as shown in FIG. 2 such that the opening angle of the upper housing 1 and lower housing 2 is 130 degrees or the like, for example.

That is to say, the rotation restricting cam members 52 are fixed to the hinge fixing portion 51 by the claws 61 provided to the rotation restricting cam member 52 being fit into the retaining grooves 60 provided to the hinge fixing portion 51 as shown in FIG. 3, with the rotation restricting cam members 52 being fixedly provided to the hinge fixing portion 51 such that the first contact face portion 56 is in contact with the contact face portion 71 of the thrust cam 70 shown in FIG. 3 in the event that the upper housing 1 and lower housing 2 are in a closed state, and such that the second contact face portion 57 is in contact with the contact face portion 71 of the thrust cam 70 shown in FIG. 3 in the event that the upper housing 1 and lower housing 2 are in the laterally opened state shown in FIG. 2.

Configuration of Thrust Cam

Figure 8:
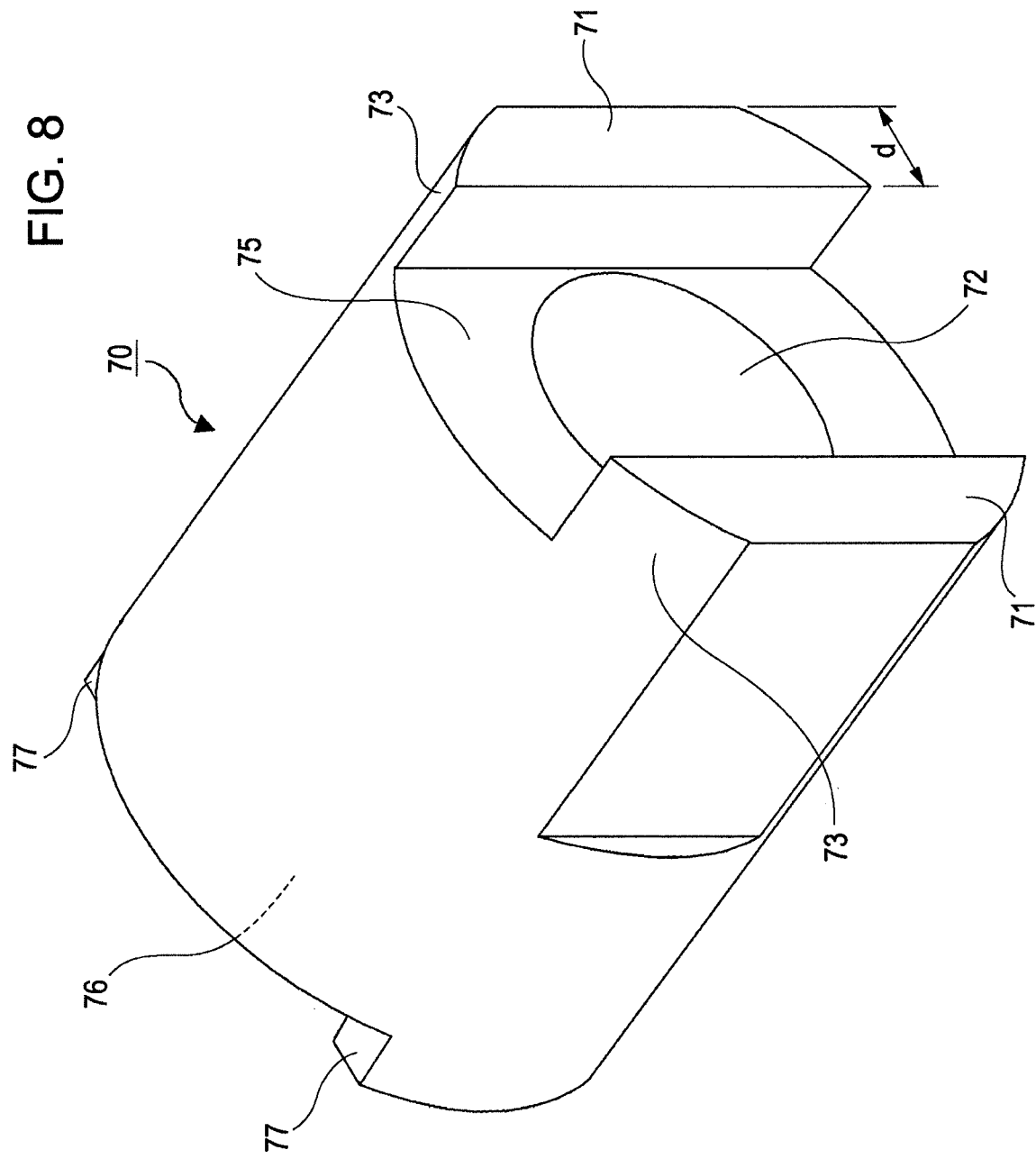
FIG. 8 is a perspective view of a thrust cam provided to the biaxial hinge portion.
Figure 9:
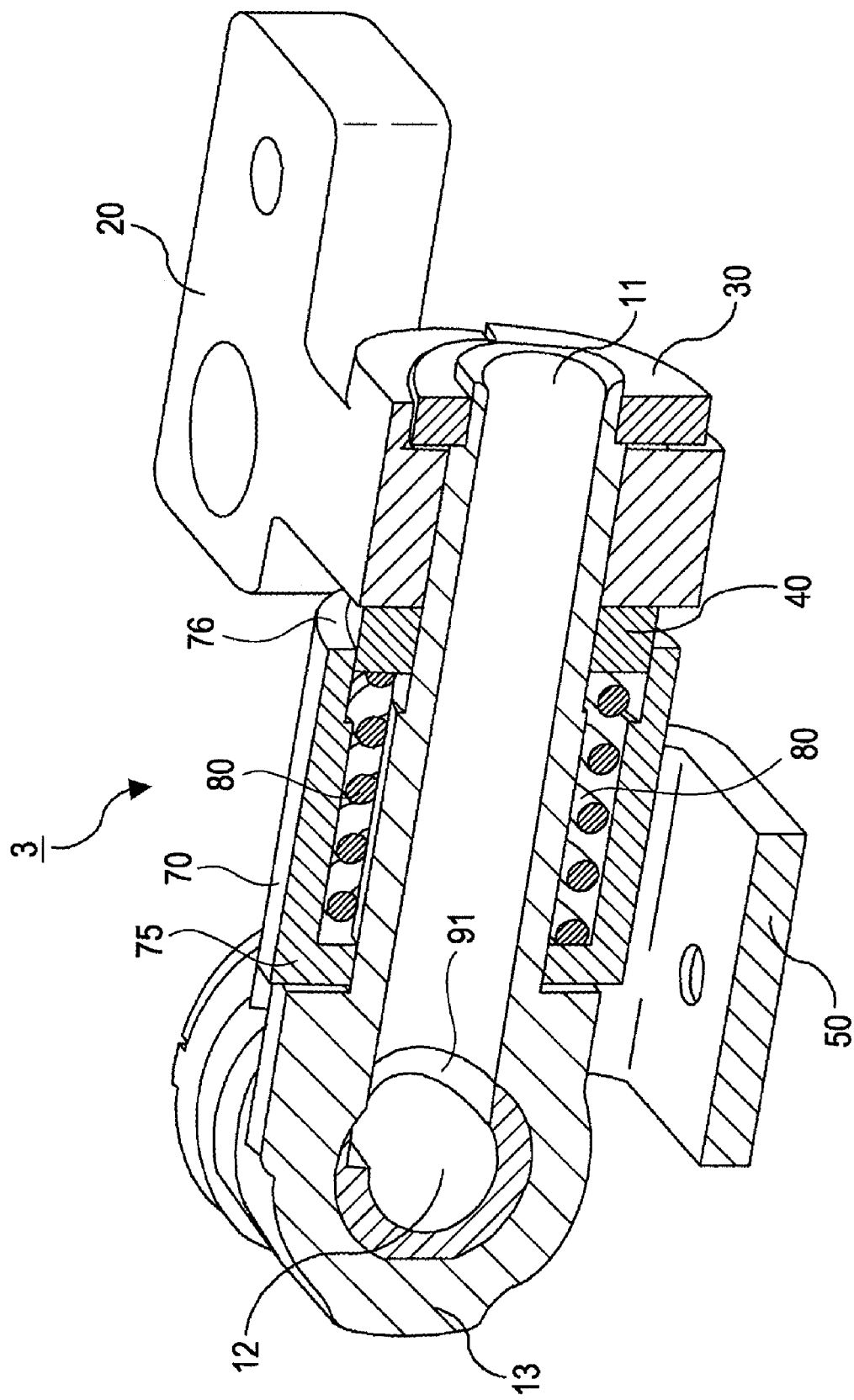
FIG. 9 is a perspective view of the biaxial hinge portion, in a cutaway state along the longitudinal direction of the first shaft member.

Next, description will be made regarding the thrust cam 70 provided to the longitudinal opening mechanism 5. FIG. 8 shows a perspective view of the thrust cam 70, and FIG. 9 is a perspective view of the biaxial hinge portion 3, in a cutaway state along the longitudinal direction of the first shaft member 11. As can be seen from FIGS. 8 and 9, has a bottomed cylindrical shape provided with a shaft insertion hole 72 into which the first shaft member 11 is inserted. As shown in FIG. 9, the first shaft member 11 is inserted into the shaft insertion hole 72 such that a bottomed face portion 75 side is at the second shaft member 12 side and a free face portion 76 side is at the arm portion 20 side, whereby the thrust cam 70 is assembled to the first shaft member 11. The thrust cam 70 also stores a spring 80 internally, with the thrust cam 70 being thus assembled to the first shaft member 11.

That is to say, at the time of assembling the biaxial hinge portion 3, the first shaft member 11 is passed through the shaft insertion hole 72 of the thrust cam 70 such that the bottomed face portion 75 is at the second shaft member 12 side. Next, the spring 80 is passed over the first shaft member 11 in this state, thereby storing the spring 80 within the thrust cam 70. Subsequently, the arm cam member 40, arm portion 20, and washer stopper 30, are assembled to the first shaft member 11 in that order. Accordingly, the thrust cam 70 is assembled to the first shaft member 11 in a state of being pressed in a direction toward the second shaft member 12 by the pressing force of the spring 80 from one end thereof. Also, the arm cam member 40 is assembled to the first shaft member 11 state of being pressed in a direction toward the arm portion 20 by the pressing force of the spring 80 from the other end thereof. That is to say, the single spring 80 presses the thrust cam 70 in the direction of the second shaft member 12 at one end thereof, and presses the arm cam member 40 in the direction of the arm portion 20 at the other end thereof.

In FIG. 8, it can be seen that the diameter of the thrust cam 70 is generally the same length as the spacing distance between the two rotation restricting cam members 52 provided across the shaft connecting member 13 as shown in FIG. 3.

Also, the thrust cam 70 is notched such that the contact face portions 71 can come into contact with the small-diameter ring-shaped members 53 of the rotation restricting cam members 52 shown in FIG. 7 in the state where the first shaft member 11 is inserted into the shaft insertion hole 72. In other words, the thrust cam 70 is notched so as to form a pair of protrusions 73, with the thickness d of the protrusions 73 being generally the same as the thickness d of the small-diameter ring-shaped member 53 of the rotation restricting cam members 52 shown in FIG. 7.

Accordingly, upon inserting the first shaft member 11 into the shaft insertion hole 72 of the thrust cam 70, the thrust cam 70 is assembled to the first shaft member 11 such that the protrusions 73 of the thrust cam 70 are held between the shaft connecting member 13 and the large-diameter ring-shaped member 54 of the rotation restricting cam members 52.

On the other hand, as shown in FIG. 8, a pair of fitting protrusions 77 are provided to the free face portion 76 of the thrust cam 70. The fitting protrusions 77 are each fit into the pair of fitting recesses 26 of the arm portion 20 shown in FIG. 5.

That is to say, the contact face portions 71 of the thrust cam 70 shown in FIG. 8 are in contact with the first contact face portions 56 provided on the small-diameter first contact face portions 56 of the rotation restricting cam members 52 as shown in FIG. 3 in the event that the cellular telephone device is in a closed state, but in the state that the cellular telephone device is laterally opened such that the opening angle of the upper housing 1 and lower housing 2 is a predetermined opening angle of 130 degrees or the like for example, the contact face portions 71 of the thrust cam 70 are in contact with the second contact face portions 57 provided to the small-diameter ring-shaped members 53 of the rotation restricting cam members 52.

As described with reference to FIG. 7, the distance from the center P of the rotation restricting cam member 52 to the first contact face portion 56 of the ring-shaped member 53 is 3 mm (thin) for example, and the distance from the center P of the rotation restricting cam member 52 to the second contact face portion 57 of the ring-shaped member 53 is 4 mm (thick) for example. Accordingly, upon transition from a state wherein the contact face portions 71 of the thrust cam 70 are in contact with the first contact face portions 56 of the rotation restricting cam members 52 (i.e., a closed state of the cellular telephone device) to a state wherein the contact face portions 71 of the thrust cam 70 are in contact with the second contact face portions 57 of the rotation restricting cam members 52 (i.e., a state of laterally opening the cellular telephone device such that the opening is around 130 degrees, for example), the thrust cam 70 is pressed in the direction of the arm portion 20 at the portions of the second contact face portions 57 which are thick, such that the thrust cam 70 moves in the direction of the arm portion 20 against the force of the spring 80, and the fitting protrusions 77 of the thrust cam 70 shown in FIG. 8 are fit into the fitting recesses 26 of the arm portion 20 shown in FIG. 5. Accordingly, when laterally opening the cellular telephone device, the opening angle of the upper housing 1 and lower housing 2 is restricted to the predetermined opening angle of around 130 degrees or the like, as described above.

Opening/Closing Operations of Cellular Telephone

Next, the opening/closing operations of the cellular telephone according to the first embodiment, based the biaxial hinge portion 3 such as described above, will be described.

Longitudinal Opening Operations

First, description will be made regarding the operation of the biaxial hinge portion 3 in a case of opening the cellular telephone from the closed state wherein the upper housing 1 and the lower housing 2 are one upon another, to the longitudinally opened state shown in FIG. 1. In this case, the user holds the upper housing 1 with the right hand for example, and holds the lower housing 2 with the left hand, and applies force to the upper housing 1 while raising the right hand. This turns the arm portion 20 on the first shaft member 11 of the biaxial hinge portion 3 which serves as a rotational shaft, while the upper housing 1 turns in the longitudinal direction (i.e., the longitudinal direction of the housings 1 and 2) such that the cellular telephone is in the longitudinally opened state shown in FIG. 1.

Figure 10:
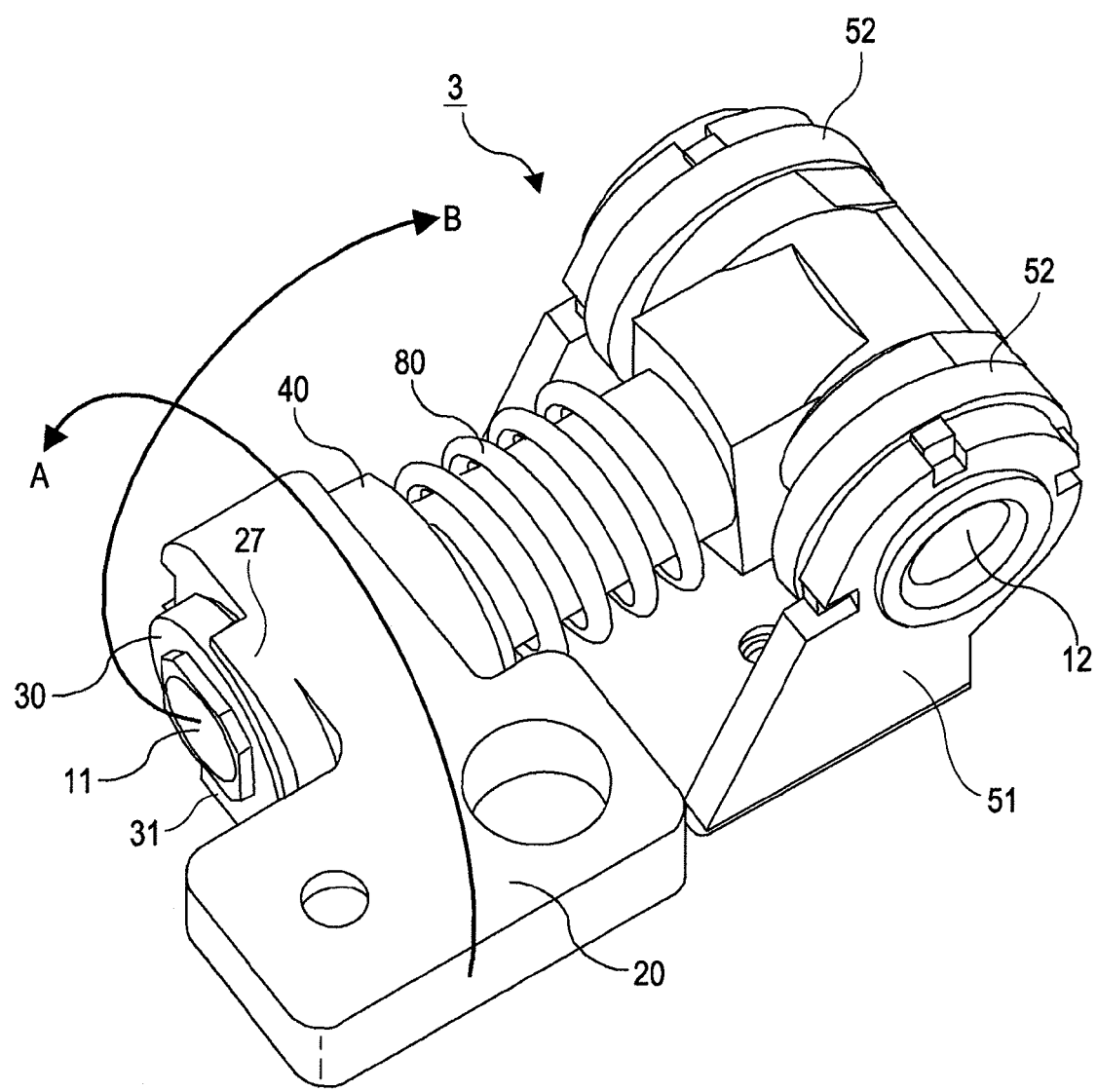
FIG. 10 is a perspective view of the biaxial hinge portion according to the first embodiment, illustrating the rotation direction of the biaxial hinge portion when opening longitudinally.

Now, the arm portion 20 is screwed to the upper housing 1 as shown in FIG. 1. Accordingly, turning the upper housing 1 in this way, the arm portion 20 is turned in the direction of the arrow A shown in FIG. 10. As described above, the arm cam member 40 shown in FIG. 6 is pressed against the cam face 24 of the arm portion 20 shown in FIG. 5 by the force of the spring 80. In a closed state of the cellular telephone, the fitting protrusions 25 provided to the cam face 24 of the arm portion 20 are each fit into the fitting recesses 42 of the arm cam member 40, but rotating the upper housing 1 in the longitudinal direction causes the fitting protrusions 25 of the arm portion 20 to press the arm cam member 40 against the force of the spring 80 such that the arm cam member 40 is moved in the direction toward the second shaft member 12 as shown in FIG. 10, so that the fitting protrusions 25 of the arm portion 20 each ride up on ridges 43 which are the portions between the fitting recesses 42 shown in FIG. 6.

Next, upon further rotating the upper housing in the longitudinal direction from this state such that the opening angle between the upper housing 1 and the lower housing 2 is around 170 degrees for example, the fitting protrusions 25 of the arm portion 20 are fit into the fitting recesses 42 of the arm cam member 40 again. Accordingly, the opening angle of the upper housing 1 and lower housing 2 is restricted to the predetermined opening angle of around 170 degrees for example, so that the cellular telephone is in the longitudinally opened state shown in FIG. 1.

Due to this arm cam member 40 being pressed by the spring 80, a clicking sound is made when the fitting protrusions 25 are fit into the fitting recesses 42 again. This clicking sound enables the user to recognize that the cellular telephone is in the longitudinally opened state.

In the case of turning the upper housing 1 such that the cellular telephone is closed from this longitudinally opened state, the fitting between the fitting protrusions 25 of the arm portion 20 and the fitting recesses 42 of the arm cam member 40 engaged at the time of being longitudinally opened is temporarily disengaged, the fitting protrusions 25 of the arm portion 20 each ride up on the ridges 43 which are the portions between the fitting recesses 42, and having passed through this riding-up state, the fitting protrusions 25 of the arm portion 20 and the fitting recesses 42 of the arm cam member 40 are fit again.

Now, upon the opening angle between the upper housing 1 and the lower housing 2 reaching around 170 degrees for example, the stopper 27 provided to the arm portion 20 shown in FIG. 10 moves very close to a stopper 31 of the washer stopper 30 provided to the first shaft member 11. Upon the user attempting to open the opening angle between the upper housing 1 and the lower housing 2 beyond 170 degrees, the stopper 27 provided to the arm portion 20 comes into contact with the stopper 31 of the washer stopper 30 provided to the first shaft member 11, thereby restricting the opening operations of the user. Accordingly, the opening angle between the upper housing 1 and the lower housing 2 can be restricted to 170 degrees plus around 1 to 3 degrees, thereby preventing the trouble of the cellular telephone being damaged due to forcible operations by the user.

Figure 11:
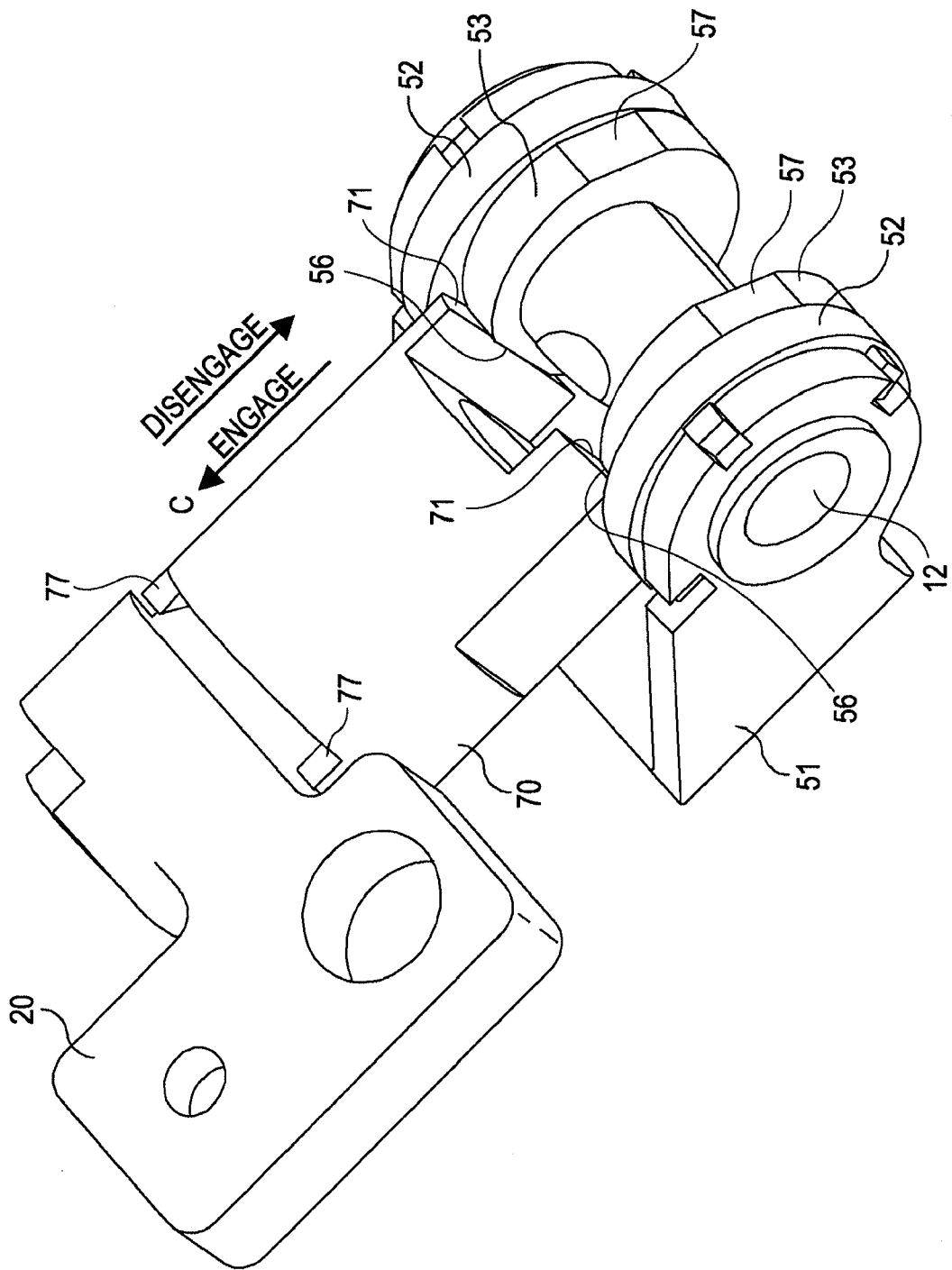
FIG. 11 is a perspective view of the biaxial hinge portion according to the first embodiment, illustrating the rotation direction of the thrust cam of the biaxial hinge portion when opening laterally.

Also, when longitudinally opening the portable telephone device, the contact face portions 71 of the protrusions 73 of the thrust cam 70 contact the first contact face portion 56 (contact face portion where distance from center P is shorter: see FIG. 7) provided to the small-diameter ring-shaped member 53 of the rotation restricting cam member 52 as shown in FIG. 11, and the protrusions 73 of the thrust cam 70 are in a state of being sandwiched between the large-diameter ring-shaped member 54 of the rotation restricting cam member 52 as shown in FIG. 11.

Thus, when longitudinally opening the portable telephone device, even if the user applies force to the upper housing 1 (or lower housing 2) so that the cellular telephone device assumes a laterally-opened state, lateral opening of the portable telephone device when longitudinally opening is restricted by the thrust cam 70 that the protrusions 73 thereof are sandwiched by the large-diameter ring-shaped member 54 of the rotation restricting cam member 52 as described above. Therefore, the trouble of the cellular telephone being damaged can be prevented in the event of force applied to open the cellular telephone device in a laterally-opened state when the cellular telephone device is in a longitudinally opened state.

Lateral Opening Operations

Next, description will be made regarding the operation of the biaxial hinge portion 3 in a case of opening the cellular telephone from the closed state wherein the upper housing 1 and the lower housing 2 are one upon another, to the laterally opened state shown in FIG. 2. In this case, the user places the cellular telephone device on the palm of the left hand for example in a horizontally long state so that the biaxial hinge portion 3 assumes an upper position, holds the upper housing 1 with the right hand, and holds the lower housing 2 with the left hand, and applies force to the upper housing 1 while pushing the right hand upwards. This turns the upper housing 1 in the lateral direction (i.e., the lateral direction of the housings 1 and 2) with the second shaft member 12 serving as a rotational shaft, such that the cellular telephone is in the laterally opened state shown in FIG. 2.

Now, the arm portion 20 is screwed to the upper housing 1 as shown in FIG. 1. Accordingly, by turning the upper housing 1 in this way, the first shaft member 11 is turned in the direction of the arrow B shown in FIG. 10 by way of the arm portion 20.

As described with reference to FIG. 7, the distance from the center P of the rotation restricting cam member 52 to the first contact face portion 56 of the ring-shaped member 53 is 3 mm (thin) for example, and the distance from the center P of the rotation restricting cam member 52 to the second contact face portion 57 of the ring-shaped member 53 is 4 mm (thick) for example. Also, in the closed state of the cellular telephone, the contact face portions 71 of the thrust cam 70 shown in FIG. 8 assembled to the first shaft member 11 are in contact with the first contact face portions 56 of the ring-shaped members 53 of the rotation restricting cam member 52 as shown in FIG. 11. Accordingly, in the closed state, the thrust cam 70 has moved to the second shaft member 12 side due to the force of the spring 80, with the later-described fitting of the fitting protrusions 77 of the thrust cam 70 and fitting recesses 26 of the arm portion 20 shown in FIG. 5 having been disengaged.

Conversely, laterally opening the cellular telephone to a state wherein the opening angle of the upper housing 1 and lower housing 2 is around 130 degrees or the like causes the contact face portions 71 of the thrust cam 70 to move to the position where the second contact face portions 57 of the small-diameter ring-shaped members 53 are provided, with the contact face portions 71 coming into contact with the second contact face portions 57.

In the state wherein the contact face portions 71 of the thrust cam 70 have come into contact with the second contact face portions 57 of the ring-shaped members 53, the thrust cam 70 is pressed in the direction of the arm portion 20 as indicated by the arrow C in FIG. 11 at the thick second contact face portions 57, such that the thrust cam 70 moves in the direction toward the arm portion 20 against the force of the spring 80. Accordingly, the fitting protrusions 77 of the thrust cam 70 shown in FIG. 8 and the fitting recesses 26 of the arm portion 20 shown in FIG. 5 are in a fit state, such that the opening angle of the upper housing 1 and lower housing 2 is restricted to the predetermined opening angle of around 130 degrees or the like, and the cellular telephone is in the laterally opened state shown in FIG. 2.

With this configuration, the washer stopper 30 prevents the arm portion 20 from falling off of the first shaft member 11. Accordingly, in the event that the user attempts to open the opening angle between the upper housing 1 and the lower housing 2 beyond 130 degrees, the arm portion 20 serves as a wall on the path of the thrust cam 70 in the direction of the arrow C, thereby restricting movement of the thrust cam 70 beyond 130 degrees. Accordingly, the opening angle between the upper housing 1 and the lower housing 2 can be restricted to 130 degrees plus around 1 to 3 degrees, thereby preventing the trouble of the cellular telephone being damaged due to forcible operations by the user.

Also, when laterally opening such a cellular telephone device, fitting protrusions 77 of the thrust cam 70 are in a state of being fitted into fitting recesses 26 of the arm portion 20, as described above. Therefore, when laterally opening such a cellular telephone device, even if the user applies force to the upper housing 1 (or lower housing 2) so as to open the cellular telephone device in the longitudinally opened state, longitudinal opening of the cellular telephone device is restricted when laterally opened with the thrust cam 70 having the fitting protrusions 77 fitted into the fitting recesses 26 of the arm portion 20. Thus, the trouble of the biaxial hinge portion 3 being damaged can be prevented in the event of force applied to open the cellular telephone device in a longitudinally-opened state when the cellular telephone device is in a laterally opened state.

Note that in the event of turning the upper housing 1 so as to returning the cellular telephone from the laterally opened state to the closed state, the contact face portions 71 of the thrust cam 70 move to the position on the ring-shaped members 53 where the first contact face portions 56 are provided, such that when the cellular telephone is in the closed state, the contact face portions 71 are in contact with the first contact face portions 56. Accordingly, the thrust cam 70 is returned to the second shaft member 12 side by the force of the spring 80, and the fitting between the fitting protrusions 77 of the thrust cam 70 and the fitting recesses 26 of the arm portion 20 which has been engaged in the laterally opened state is disengaged.

Cable Passage Configuration

Figure 12:
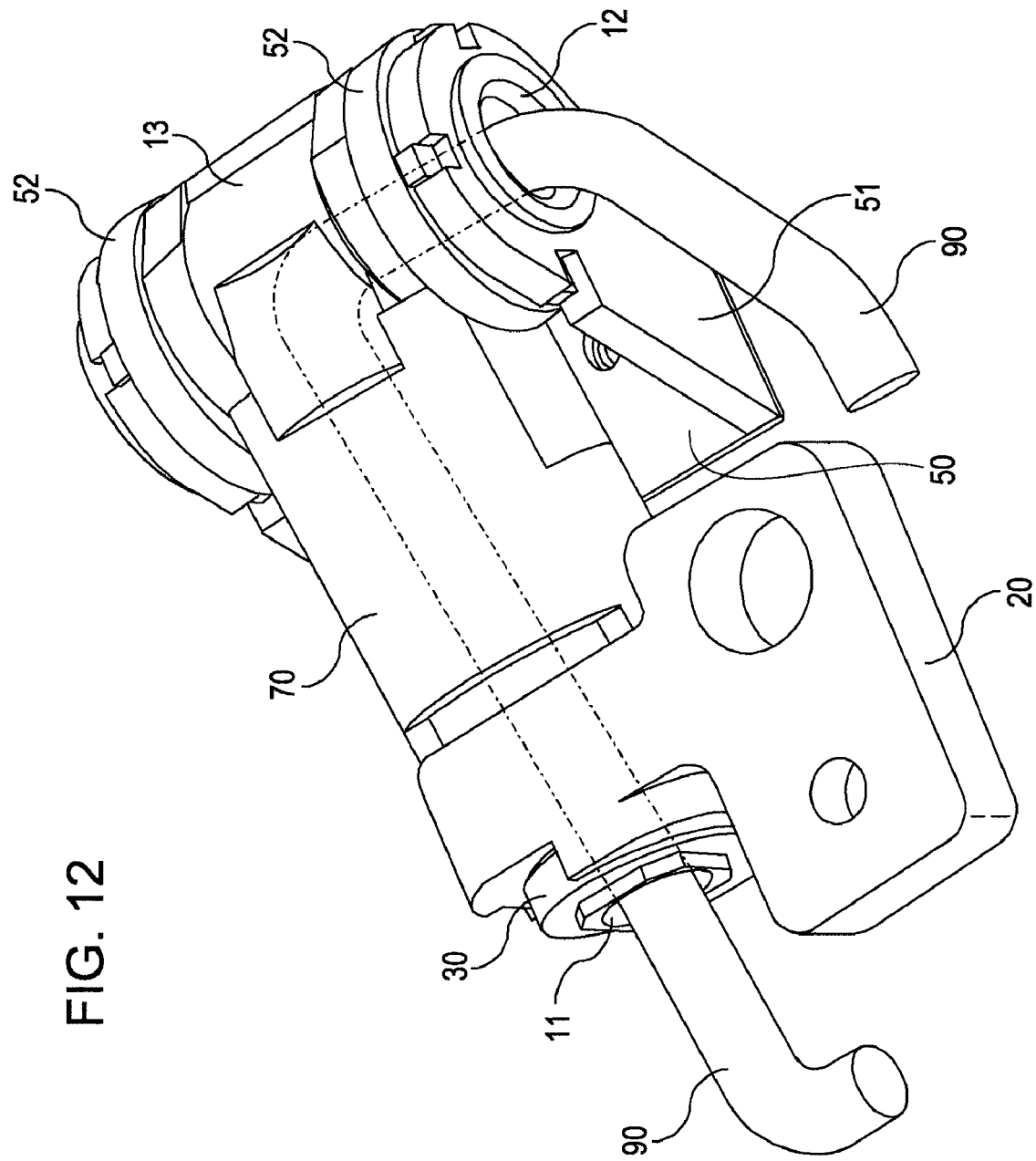
FIG. 12 is a diagram illustrating a state wherein a cable has been passed through the interior of the biaxial hinge portion.

Next, the biaxial hinge portion 3 enabling longitudinal opening and lateral opening as described above is capable of receiving passing of a cable 90 shown in FIG. 12, through inner holes in the first shaft member 11 and second shaft member 12, both having tubular shapes. Specifically, as shown in the cross-sectional drawing in FIG. 9, the first shaft member 11 has a hole portion passing through the longitudinal direction of the first shaft member 11, and in the same way, the second shaft member 12 also has a hole portion passing through the longitudinal direction of the second shaft member 12.

Also, the second shaft member 12 has a communicating hole 91 for communicating between the hole of the second shaft member 12 and the hole of the first shaft member 11, the communicating hole 91 being provided on the outer circumference of the second shaft member 12 at the portion connected to the first shaft member 11. Accordingly, upon inserting the second shaft member 12 into the shaft connecting member 13, the hole of the second shaft member 12 is connected to the hole of the first shaft member 11 via the communicating hole 91 provided on the outer circumference of the second shaft member 12, such that a generally T-shaped communicating hole portion is formed overall, as can be seen from FIG. 12. Thus, multiple cables 90 can be laid via the holes of the shaft members 11 and 12.

Accordingly, electric parts such as display units or the like disposed on the upper housing 1 side for example, and electric parts such as circuit boards provided to the lower housing 2, can be electrically connected with each other by cables passing through the shaft members 11 and 12. Also, laying the cables through the holes of the shaft members 11 and 12 can prevent trouble such as twisting and severing of the cables 90 at the time of longitudinal opening operations and lateral opening operations of the cellular telephone.

Advantages of First Embodiment

As can be clearly understood from the above description, with the cellular telephone according to the first embodiment, the arm cam member 40 for performing rotational position restriction in the longitudinal opening direction of the cellular telephone is brought into contact with the arm portion 20 by force from the other end portion of the spring 80, and the thrust cam 70 is brought into contact with the rotation restricting cam member 52 for performing rotational position restriction in the lateral opening direction of the cellular telephone by force from the one end portion of the spring 80. Accordingly, rotational position restriction in the longitudinal opening direction of the cellular telephone and rotational position restriction in the lateral opening direction can be realized with a single spring 80.

That is to say, while the related art has used one spring each for rotational position restriction in the longitudinal opening direction and the lateral opening direction, the single spring 80 can serve as both. Accordingly, the space which had been used for the two springs with the related art can be reduced to the space for the spring 80 alone, whereby the biaxial hinge portion 3 itself can be reduced in size, and also the size of the cellular telephone according to the present embodiment to which the biaxial hinge portion 3 has been provided can also be reduced.

Second Embodiment

Next, a cellular telephone device serving as a second embodiment of the present invention will be described. The above-described cellular telephone device of the first embodiment has two (a pair of) rotation restricting cam members; but the cellular telephone device according to the second embodiment reduces the necessary rotation restricting cam members to one, while providing a further miniaturized biaxial hinge portion to the cellular telephone device.

Configuration of Cellular Telephone According to Second Embodiment

Figure 13:
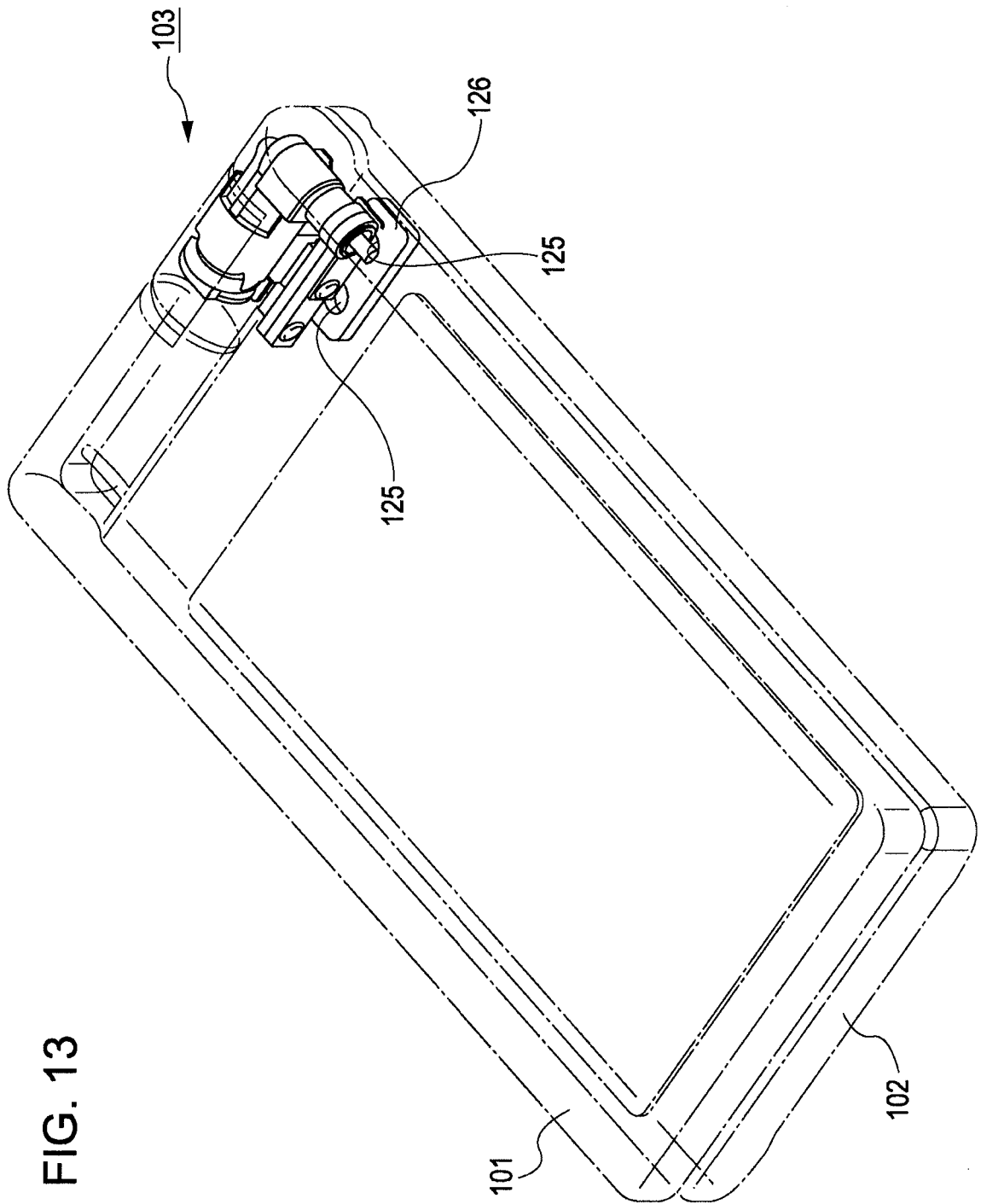
FIG. 13 is a perspective view of a cellular telephone device to which a second embodiment of the present invention has been applied, in a closed state.
Figure 14:
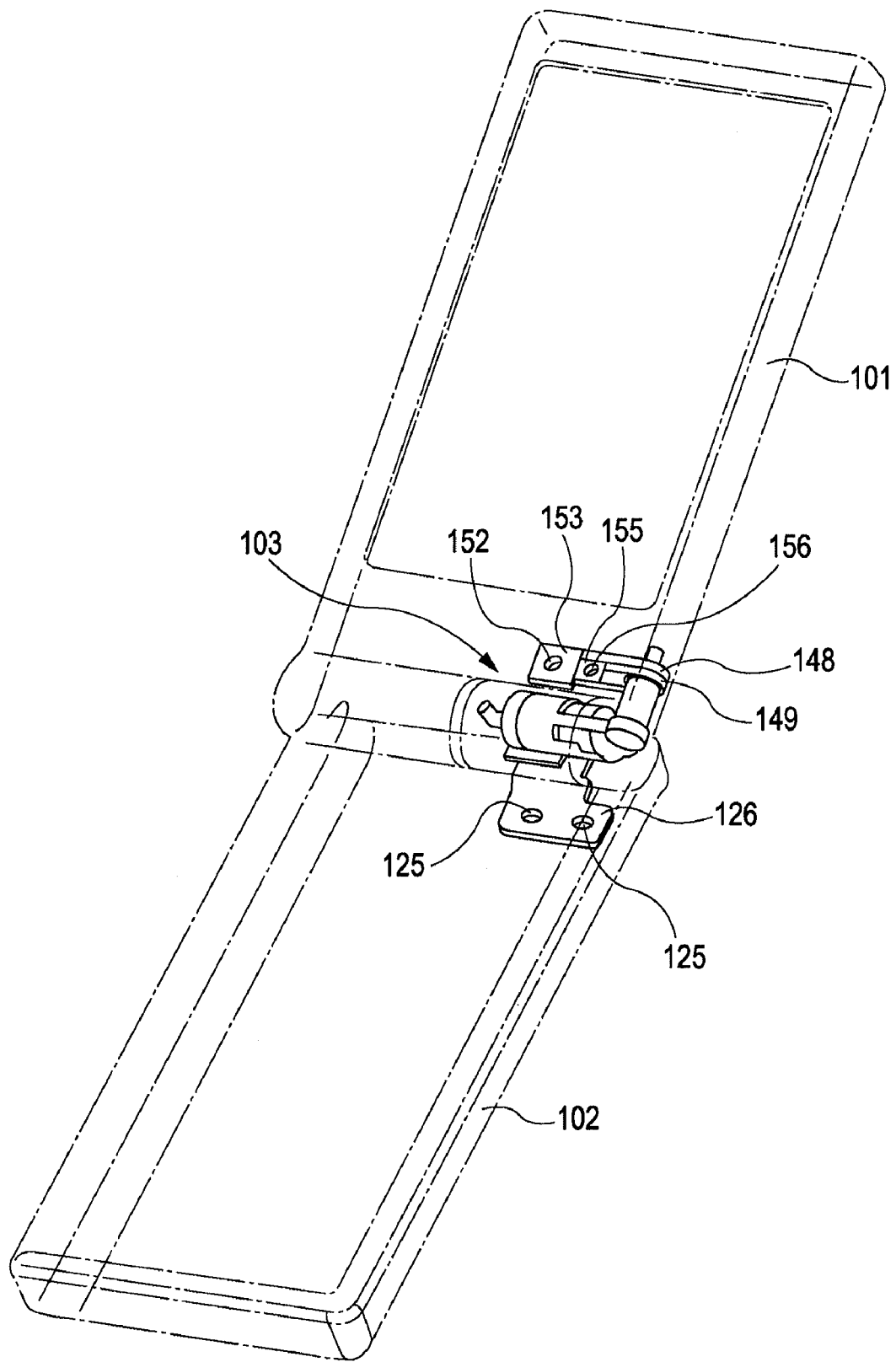
FIG. 14 is a perspective view of the cellular telephone device according to the second embodiment, in a longitudinally-opened state.
Figure 15:
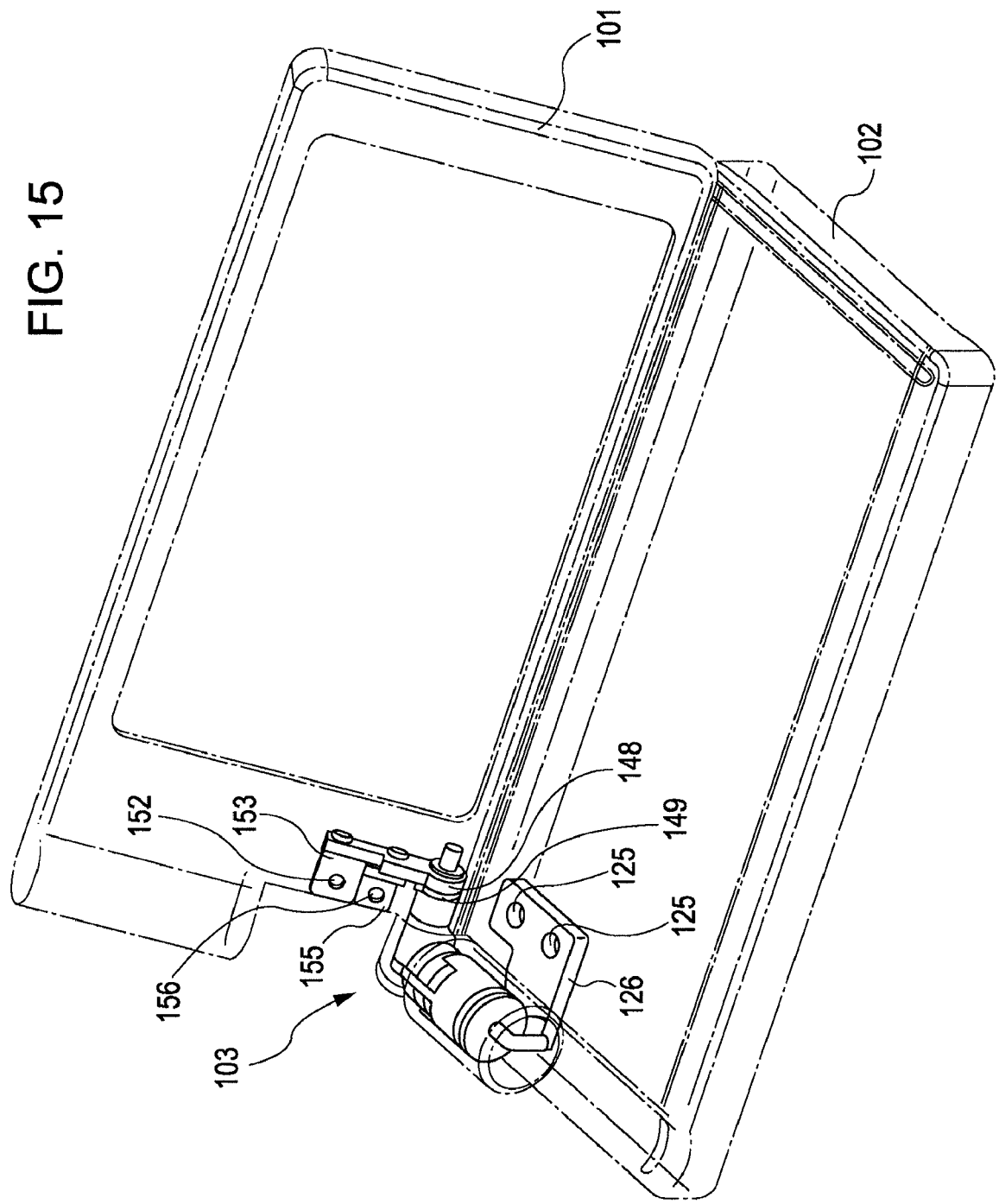
FIG. 15 is a perspective view of the cellular telephone device according to the second embodiment, in a laterally-opened state.

FIG. 13 is a perspective view of a cellular telephone device to which the second embodiment of the present invention has been applied, in a closed state, FIG. 14 is a perspective view of the cellular telephone device to which the second embodiment of the present invention has been applied, in a longitudinally-opened state, and FIG. 15 is a perspective view of the cellular telephone device according to the second embodiment, in a laterally-opened state. As shown in FIGS. 13 through 15, the cellular telephone device according to the second embodiment has an upper housing 101 in which is provided a display unit such as a liquid crystal display unit or organic EL (Electro Luminescence) display unit, a lower housing 102 where operating units such as rotational operation keys and numerical keys and the like are disposed, and a biaxial hinge portion 103 enabling the upper housing 101 and the lower housing 102 to be opened/closed longitudinally to a longitudinally opened state and laterally to a laterally opened state on approximately orthogonal rotational axes.

Configuration of Biaxial Hinge Portion

Figure 16:
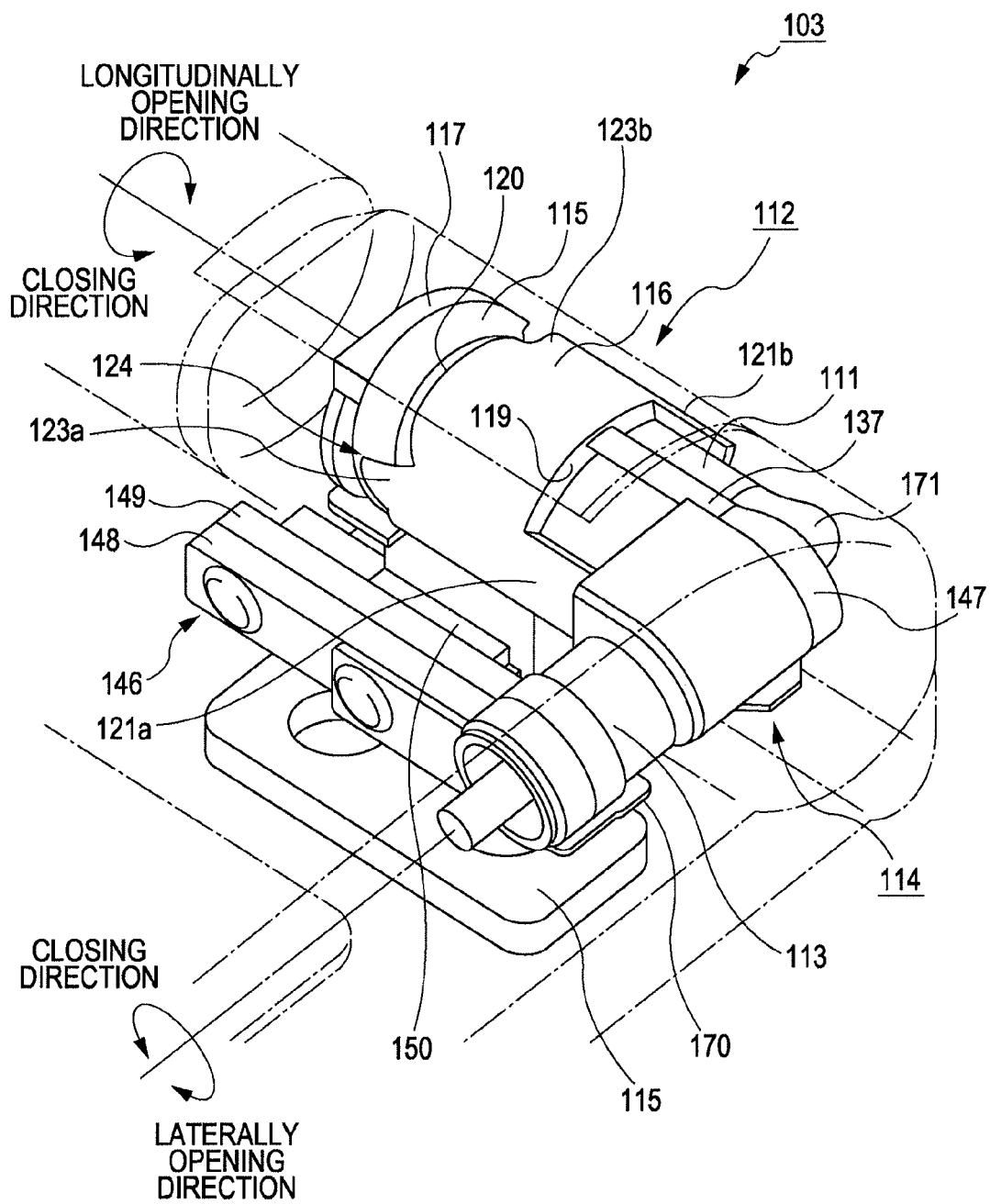
FIG. 16 is a perspective view of the biaxial hinge portion provided to the cellular telephone device according to the second embodiment.

The biaxial hinge portion 103 has a longitudinal opening mechanism 112 which includes a first shaft member 111 which is a generally rod-shaped member as shown in FIG. 16, and a lateral opening mechanism 114 having a second shaft member 113.

Configuration of Longitudinal Opening Mechanism

Figure 17:
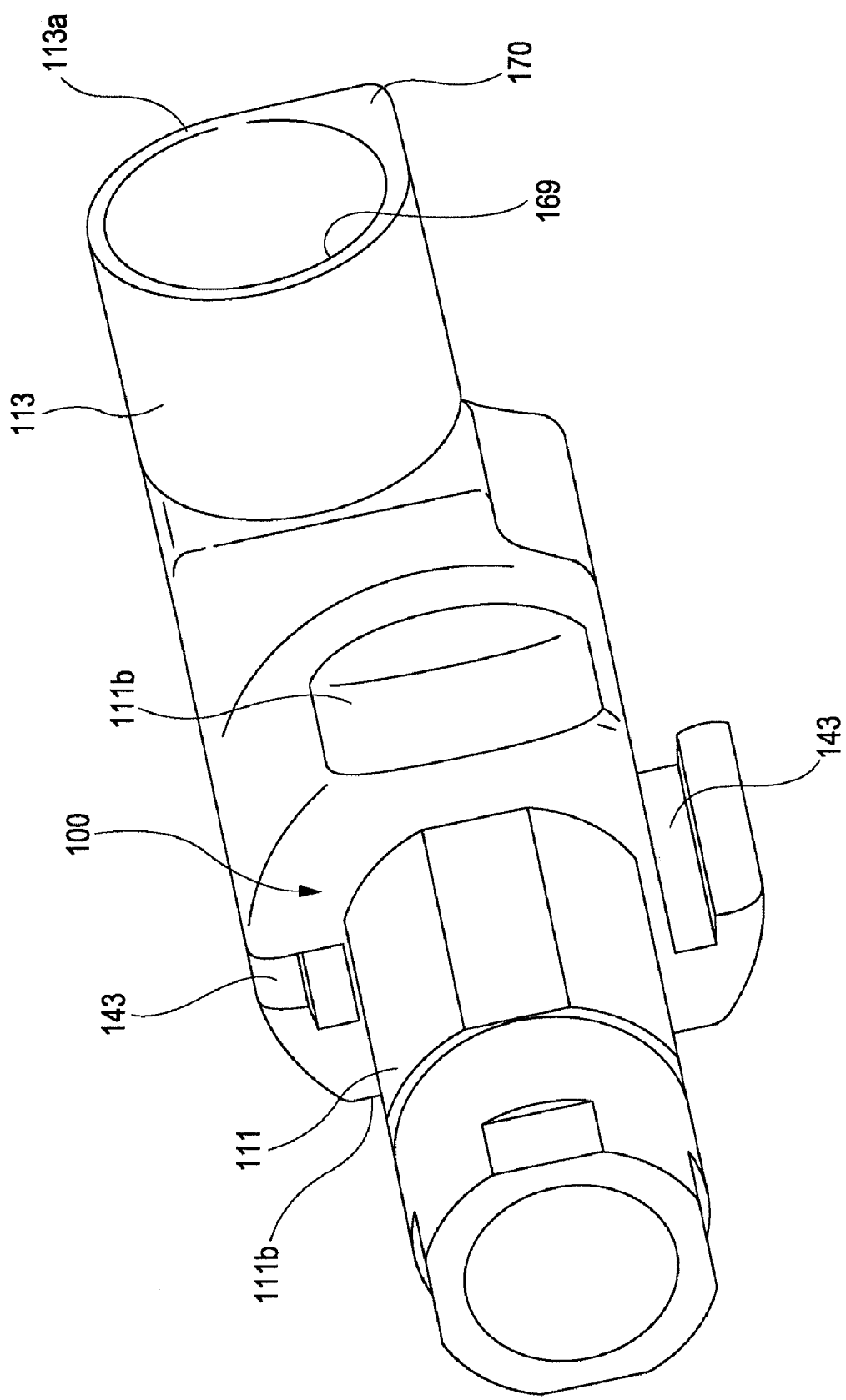
FIG. 17 is a perspective view of a first and second shaft member and shaft connecting member provided to the biaxial hinge portion according to the second embodiment.

One end portion of the first shaft member 111 of the longitudinal opening mechanism 112 is connected to one end portion of the second shaft member 113 of the lateral opening mechanism 114 with the shaft connecting member 100 as shown in FIG. 17. Specifically, the shaft members 111 and 113 are connected with the shaft connecting member 100 so as to have an overall general L-shape, by mutually connecting one end portion each such that the shaft members 111 and 113 are generally orthogonal to one another.

Note that the first shaft member 111, second shaft member 113, and shaft connecting member 100 are integrally formed with a metallic member such as stainless steel, iron, aluminum or the like and a hard plastic member such as ABS resin or the like, for example.

The longitudinal opening mechanism 112 which rotates with the first shaft member 111 as a rotational shaft is a mechanism causing a cellular telephone to be in a longitudinally open state as shown in FIG. 14, and as shown in FIG. 16, is made up of a longitudinally open arm portion 115 which is screwed to the lower housing 102 as to the first shaft member 111, a thrust cam 116 to restrict the opening angle when laterally opening the cellular telephone device at approximately 130 degrees, a stopper 117 to restrict the opening angle when longitudinal opening the cellular telephone device at approximately 170 degrees, and a slide key 137 to control movement along the first shaft member 111 of the thrust cam 116.

Configuration of Thrust Cam

Figure 18A:
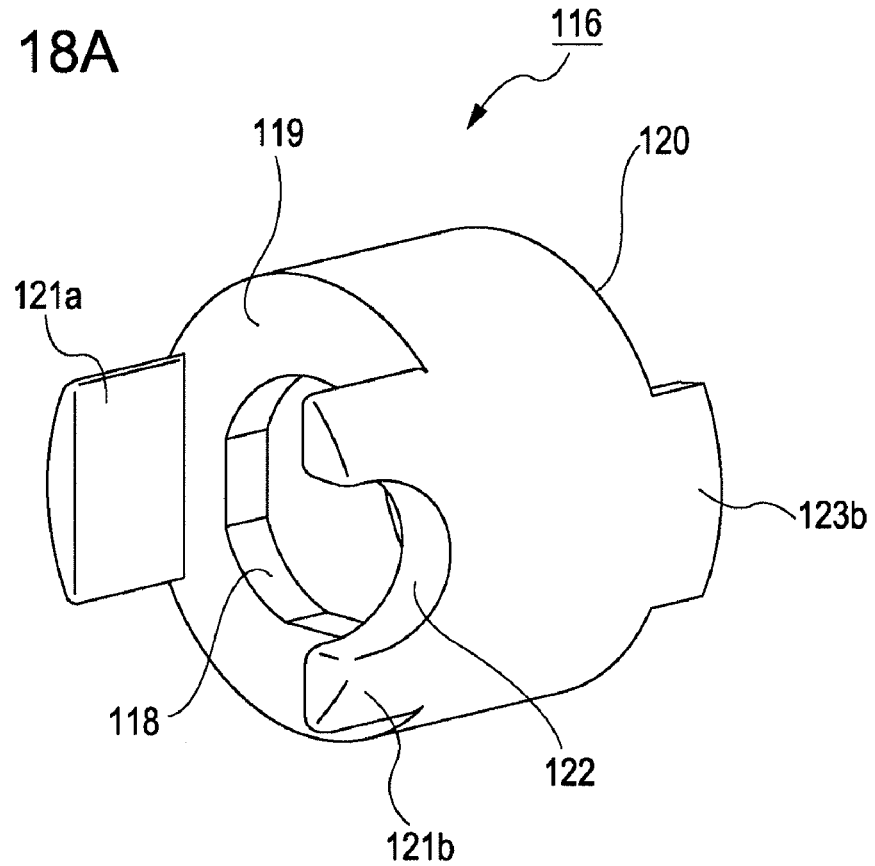
FIGS. 18A and 18B are perspective views of a thrust cam provided to a biaxial hinge portion of the cellular telephone device according to the second embodiment.
Figure 18B:
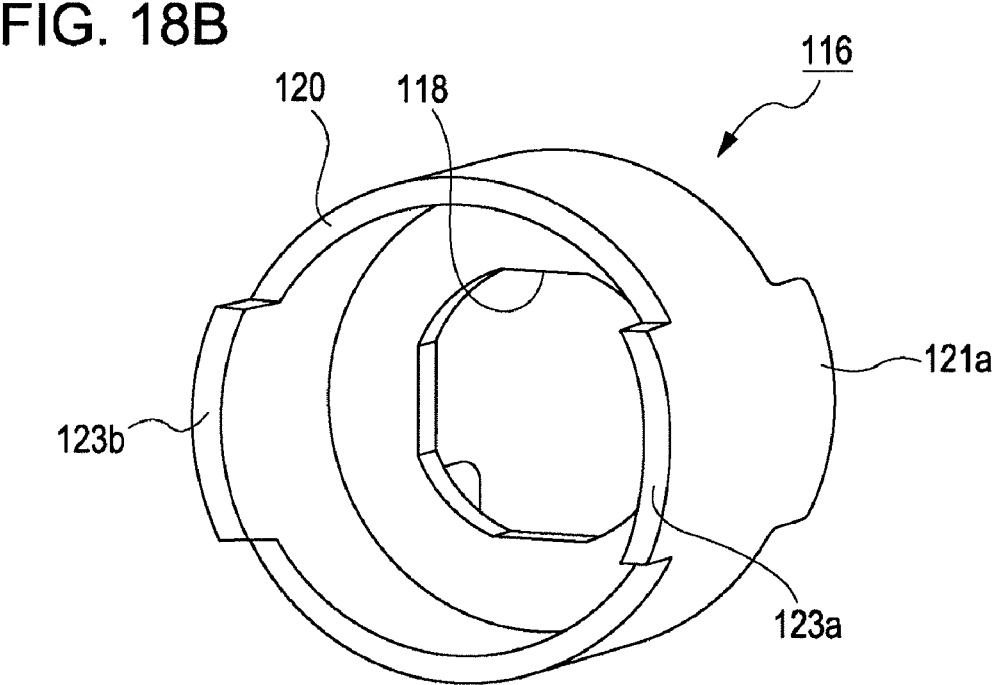

FIG. 18A shows a perspective view of the thrust cam 116 from the upper right diagonally, and FIG. 18B shows a perspective view of the thrust cam from the back face side. As can be seen from FIGS. 18A and 18B, the thrust cam 116 has a bottomed cylindrical shape provided with a shaft insertion hole 118 into which the first shaft member 111 is inserted. As shown in FIG. 16, the first shaft member 111 is inserted into the shaft insertion hole 118 such that a bottomed face portion 119 side is at the connection portion side of the first and second shaft members 111 and 113, and a free face portion 120 side is at the arm portion 115 side, whereby the thrust cam 116 is assembled to the first shaft member 111.

Also, the thrust cam 116 is provided to the first shaft member 111 with one or multiple generally disk-shaped disc springs (unshown) having a hole portion with a diameter slightly larger than the diameter of the first shaft member 111 which are stored in the thrust cam 116.

Also, the thrust cam 116 has a pair of protrusions (fitting protrusions) 121a and 121b provided so as to protrude in the opposite direction as to the direction of the free face portion 120 from the bottomed face portion 119 side, on the bottomed face portion 119 side. The distance between the protrusions 121a and 121b are generally the same distance as the distance between a pair of fitting recesses 111b provided to the shaft connecting member 100 shown in FIG. 17. The protrusions 121a and 121b of the thrust cam 116 fit into each of the fitting recesses 111b provided to the shaft connecting member 100.

Also, the thrust cam 116 has a pair of protrusions (fitting protrusions) 123a and 123b provided so as to protrude in the opposite direction as to the direction of the bottomed portion 119 from the free face portion 120 side, on the free face portion 120 side. The distance between the protrusions 123a and 123b are generally the same distance as the pair of fitting recesses 124 provided to the longitudinal opening arm portion 115. The protrusions 123a and 123b of the thrust cam 116 each fit into the pair of fitting recesses 124 provided to the longitudinal opening arm portion 115.

As will be described later, the protrusions 121a and 121b provided to the bottomed face portion 119 side of the protrusions 121a and 121b, and protrusions 123a and 123b, provided to the thrust cam 116, each fit with the fitting recesses 111b provided to the shaft connecting member 100 when closing the cellular telephone device as shown in FIG. 13 and when longitudinal opening the cellular telephone device as shown in FIG. 14. When laterally opening the cellular telephone device, the fittings between the protrusions 121a and 121b of the thrust cam 116 and the fitting recesses 111b provided to the shaft connecting member 100 are released.

Conversely, the protrusions 123a and 123b provided to the free face portion 120 side of the thrust cam 116 fit with the fitting recesses 124 provided to the longitudinal opening arm portion 115 (see FIG. 19) when laterally opening the cellular telephone as shown in FIG. 15, and the fittings between the fitting recesses 124 provided to the longitudinal opening arm portion 115 are released when closing the cellular telephone device as shown in FIG. 13 and when longitudinal opening the cellular telephone device as shown in FIG. 14.

Also, of the protrusions 121a and 121b provided to the bottomed face portion 119 side of the thrust cam 116, a cutout portion 122 is provided to the one protrusion 121b side to prevent a cable passed in the biaxial hinge portion 116 as shown in FIG. 18A from being wedged therein.

As will be described later, the first shaft member 111 and second shaft member 113 of the biaxial hinge portion 116 are each formed so as to be hollow, and the biaxial hinge portion 116 is formed such that a cable can be passed within each of the shaft members 111 and 113. Also, when closing (see FIG. 13) or longitudinal opening the cellular telephone device (see FIG. 14), the thrust cam 116 is moved in the connecting portion direction of the shaft members 111 and 113, whereby the protrusions 121a and 121b of the thrust cam 116 and the fitting recesses 111b provided to the shaft connection member 100 are each fit together.

Therefore, a cutout portion 122 is provided only to the protrusion 121b side described above wherein there is the danger of wedging, so as not to wedge the cable passed with in each shaft member 111 and 113 with the protrusion of the thrust cam 116, in the even of the thrust cam 116 moving in the connecting direction of the shaft members 111 and 113, thereby preventing wedging of a cable.

Configuration of Longitudinal Opening Arm Portion

Figure 19:
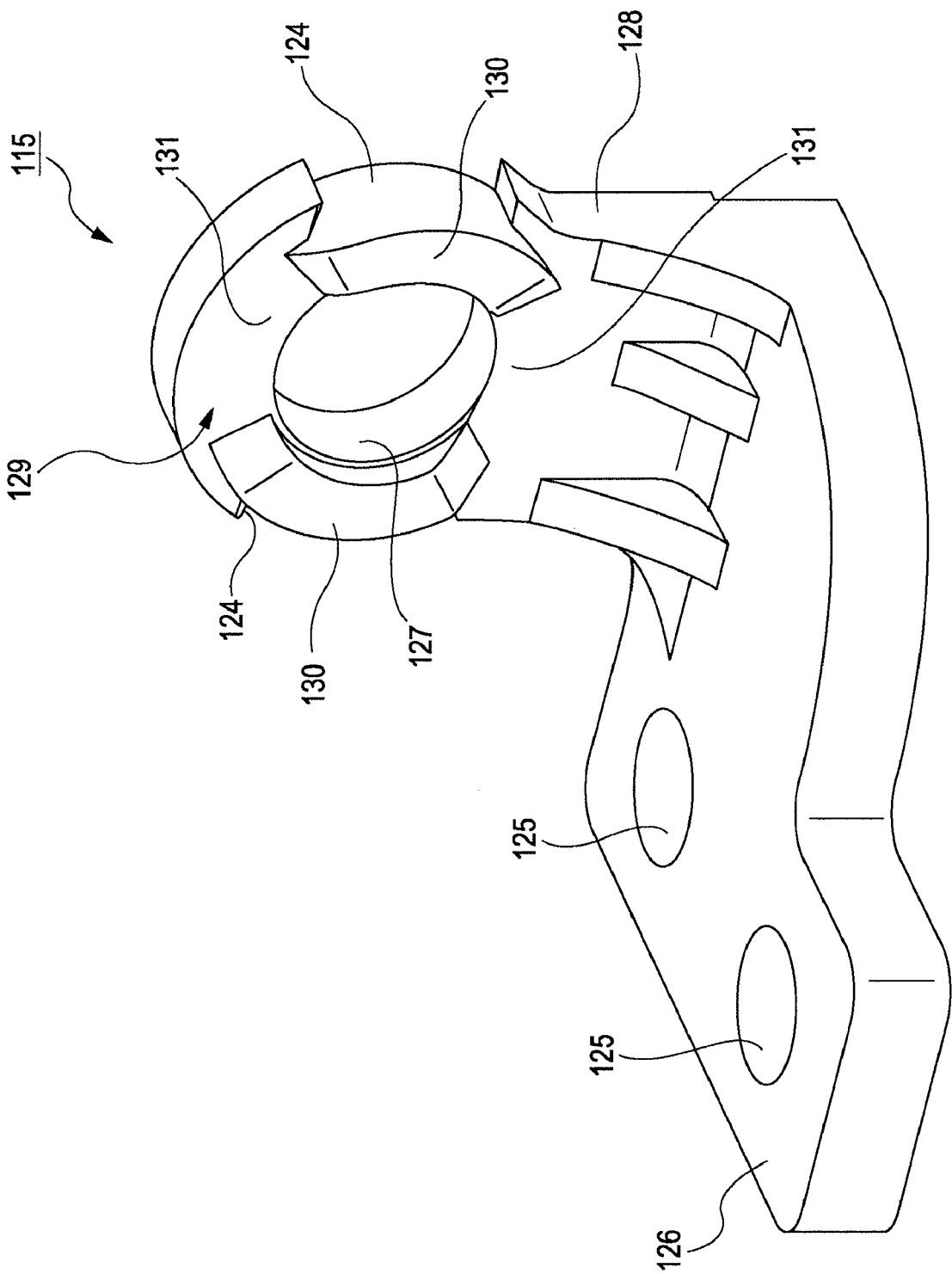
FIG. 19 is a perspective view of a longitudinal opening arm portion provided to the biaxial hinge portion of the cellular telephone device according to the second embodiment.

Next, FIG. 19 is a perspective view of the longitudinal opening arm portion 115. As can be seen from FIG. 19, the longitudinal opening arm portion 115 has a flat-shaped attaching portion 126 having a pair of screw holes 125 to fix the longitudinal opening arm portion 115 to the lower housing 102, as shown in FIGS. 13 through 15. Also, the longitudinal opening arm portion 115 has a shaft turning supporting portion 128 having a shaft inserting hole portion 127 to insert the first shaft member 111 therein. The shaft turning supporting portion 128 is integrally formed with the attaching portion 126 so as to stand in the generally vertical direction as to the flat-shaped attaching portion 126.

Also, the shaft inserting hole portion 127 has a generally round shape. Therefore, the first shaft member 111 inserted in the shaft inserting hole portion 127 is turnable within the shaft inserting hole portion 127.

The shaft turning supporting portion 128 has a pair of fitting recesses 124 along the outer circumference of the shaft inserting hole portion 127. The protrusions 123a and 123b of the thrust cam 116 are each fit as to the fitting recesses 124 when laterally opening the cellular telephone device as shown in FIG. 15.

Also, the shaft turning supporting unit 128 has a pair of protrusions 130 provided on the thrust cam facing face portion 129 side which is the face portion on the side that the thrust cam 116 is mounted, in positions facing one another. Also, the thrust cam facing face portion 129 is a recess portion 131 except for the protrusion portions 130. That is to say, the thrust cam facing face portion 129 has a pair of protrusions 130 and a pair of recesses 131. The protrusions 130 and recesses 131 are arranged such that the recesses and protrusions of the click cam to be described below are fit, respectively.

Configuration of Click Cam

Figure 20:
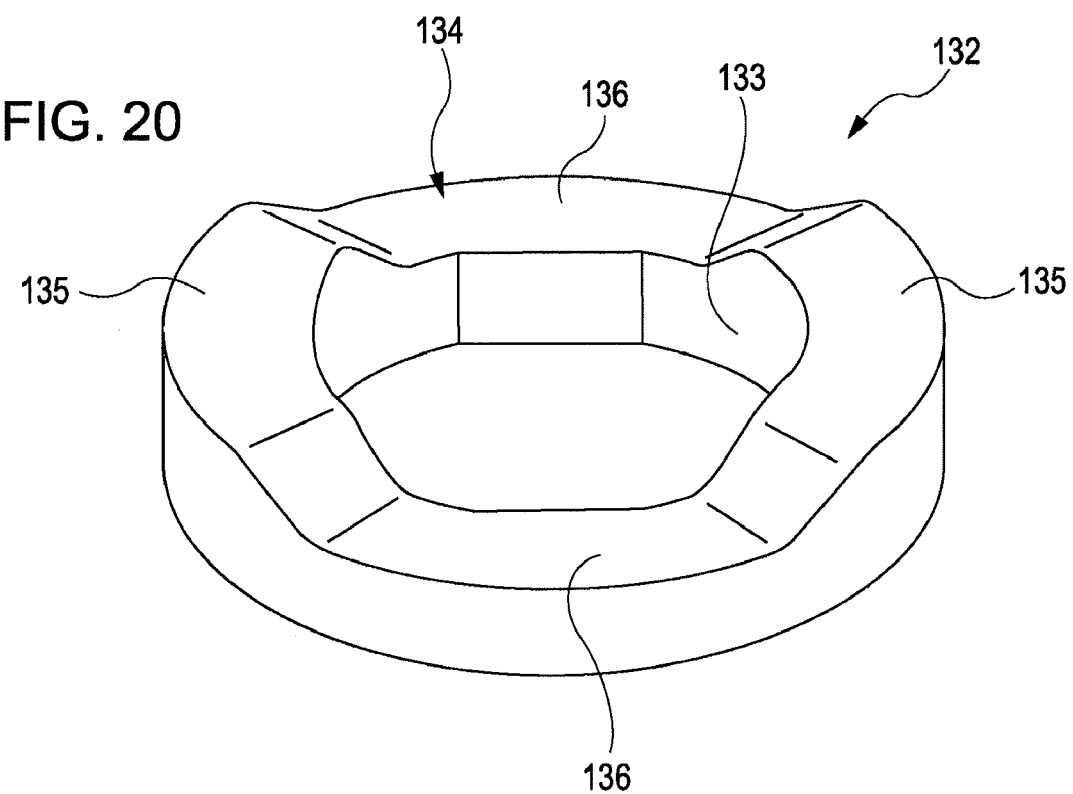
FIG. 20 is a perspective view of a click cam provided to the biaxial hinge portion of the cellular telephone device according to the second embodiment.

Next, FIG. 20 is a perspective view of a click cam 132. The click cam 132 has a general disk shape having a shaft inserting hole portion 133 wherein the first shaft member 111 is inserted. The diameter of the click cam 132 has a diameter slightly smaller than the diameter of the free face portion 120 side of the thrust cam 116 as shown in FIG. 18B, and the click cam 132 is stored in the thrust cam 116, along with the above-described disc spring, in a state that the shaft member 111 is inserted in the shaft inserting hole portion 133.

Also, the shaft inserting hole portion 133 has a polygonal shape such as a pentagon or octagon, for example. As will be described later, a portion processed to be a polygonal shape of the first shaft member 111 is inserted in the shaft inserting hole portion 133. Therefore, the click cam 132 is turnable along the turning direction of the first shaft member 111.

Also, the click cam 132 has a pair of protrusions 135 provided to positions corresponding to cam face portions 134 which are face portions facing the thrust cam facing face portions 129 of the longitudinal opening arm portion 115 (see FIG. 19). Also, the portions of the cam face portion 134 other than the protrusions 135 are recesses 136. That is to say, the cam face portion 134 has a pair of protrusions 135 and a pair of recesses 136. The protrusions 135 of the cam face portion 134 are fitted with the recesses 131 provided to the thrust cam facing face portion 129 of the longitudinal opening arm portion 115 shown in FIG. 19, and the recesses 136 of the cam face portion 134 are arranged so as to fit with the protrusions 130 provided to the thrust cam facing face portion 129 of the longitudinal opening arm portion 115 shown in FIG. 19.

Such a click cam 132 is stored in the thrust cam 116 along with the above-described disc spring, whereby the cam face portion 134 of the click cam 132 is pressed against the thrust cam facing face portion 129 of the longitudinal opening arm portion 115 with the pressing force of the disc spring. Also, the click cam 132 turns along with the first shaft member 111 as described above. Therefore, when the cellular telephone device is longitudinally opened, upon the first shaft member 111 turning, the protrusions 135 and recesses 136 of the cam face portion 134 of the click cam 132, and the protrusions 130 and recesses 131 of the thrust cam facing face portion 129 of the longitudinal opening arm portion 115 are fit together and released from fitting repeatedly, and upon the protrusions 135 of the cam face portion 134 of the click cam 132 fitting into the recesses 131 of the thrust cam facing face portion 129 of the longitudinal opening arm portion 115, a clicking sound such as "click" occurs.

Configuration of Slide key

Figure 21:
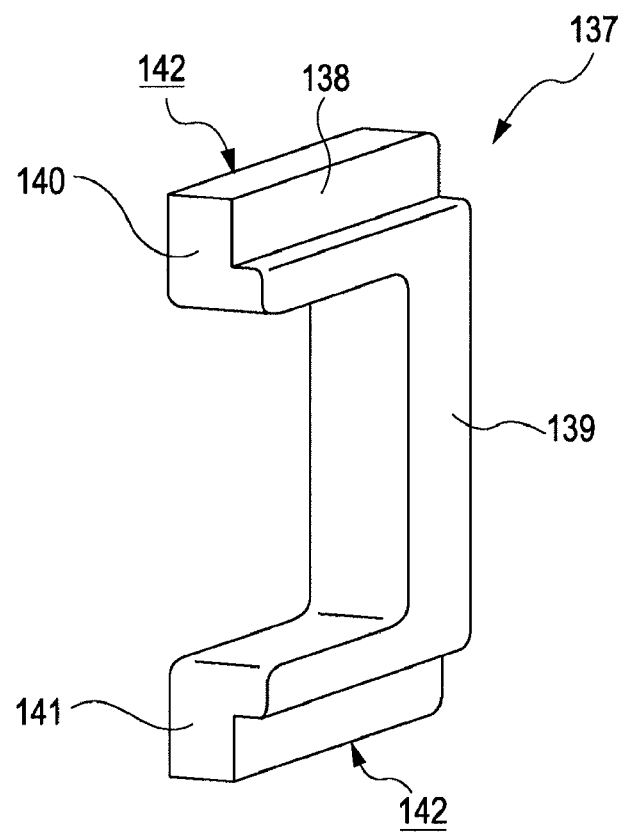
FIG. 21 is a perspective view of a slide key provided to the biaxial hinge portion of the cellular telephone device according to the second embodiment.

Next, FIG. 21 is a perspective view of the slide key 137. As can be seen from FIG. 21, the slide key 137 is integrally formed such that a small, generally sideways U-shaped second flat-shaped member 139 is layered on a large, generally sideways U-shaped first flat-shaped member 138. Therefore, the small, generally sideways U-shaped second flat-shaped member 139 protrudes from the large, generally sideways U-shaped first flat-shaped member 138. Also, an end portion 140 of the slide key 137 is in a general L-shape, and the other end portion 141 is in a general reverse-L-shape.

Such a slide key 137 has a pair of pieces forming the generally sideways U-shape to serve as inserting pieces 142, and upon the inserting pieces 142 being inserted into a slide groove of the shaft connecting member 100 described below (reference numeral 143 in FIGS. 17, 22, and 23), the slide key 137 is provided along the first shaft member 111.

Figure 22:
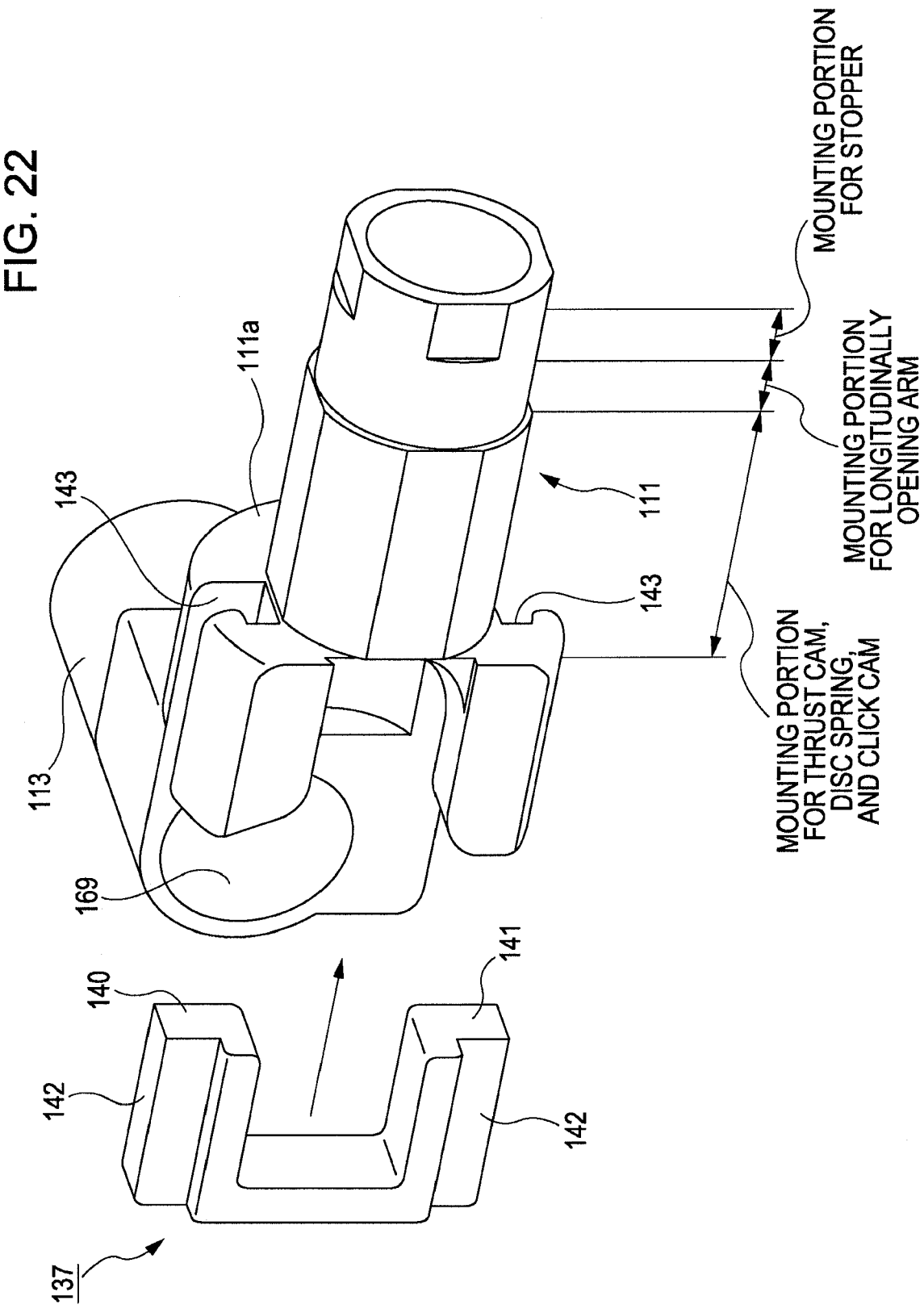
FIG. 22 is a diagram to describe mounting a slide key as to a slide groove provided to the shaft connecting portion of the biaxial hinge portion of the cellular telephone device according to the second embodiment.
Figure 23:
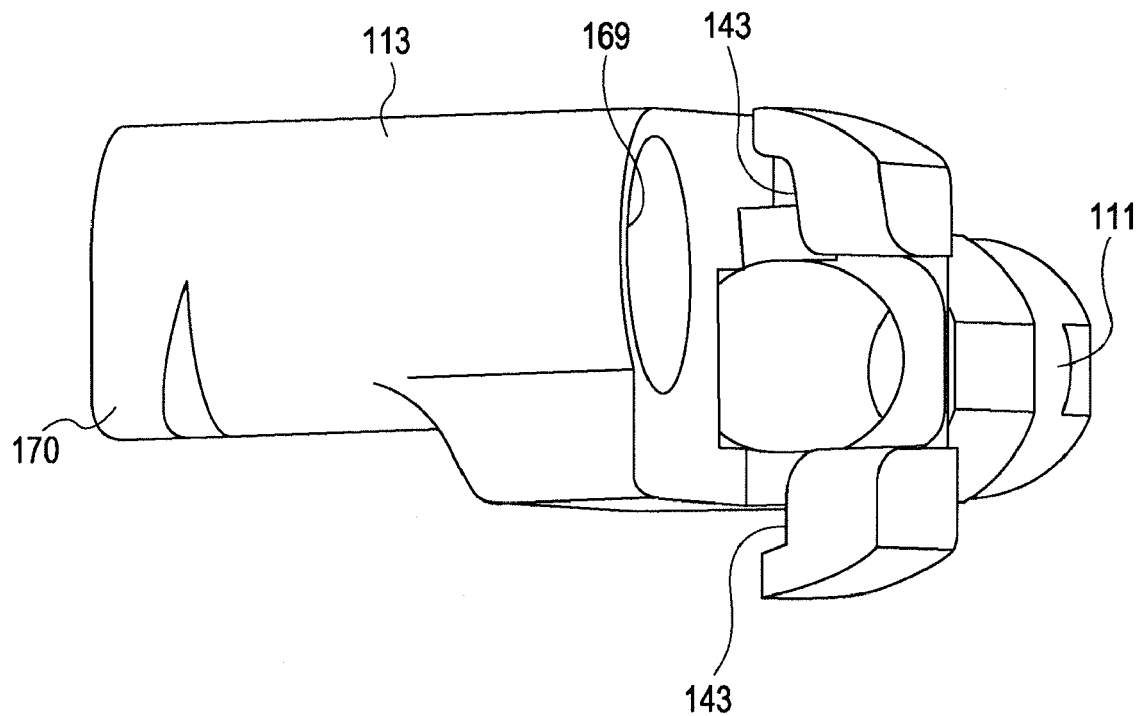
FIG. 23 is a perspective view of a state viewed from the back side of a first and second shaft member and shaft connecting member provided to the biaxial hinge portion according to the second embodiment.

FIG. 22 is a perspective view of the first shaft member 111 seen from the side face side, and FIG. 23 is a perspective view of the first shaft member 111 seen from the back face side (the connecting portion side of the first shaft member 111 and second shaft member 113). As can be seen from FIGS. 22 and 23, a pair of slide grooves 143 along the lengthwise direction of the first shaft member 111 are provide as to the shaft connecting member 100 which connects the first shaft member 111 and second shaft member 113.

The slide grooves 143 are groove portions in an L-shape or reverse-L-shape so that the inserting pieces 142 of the slide key 137 can be slidably inserted. The inserting pieces 142 of the slide key 137 are to be inserted from the one end portion 140 and other end portion 141 of the slide key 137 into the slide grooves 143, as shown in FIG. 22, but in this event, the slide grooves 143 are formed along the lengthwise direction of the first shaft member 111 so that the inserting pieces 142 of the inserted slide key 137 are positioned above/below the first shaft member 111.

Note that the slide groove portions 143 are groove portions in an L-shape or reverse-L-shape as described above, whereby, when the inserting pieces 142 of the slide key 137 are slidably inserted in the slide groove 143, the slide key 137 is fixed to the first shaft member 111 so as to be movable only in the lengthwise direction of the first shaft member 111 along the slide groove portions 143.

As will be described later, with the slide key 137, the thrust cam 116 is moved to the longitudinal opening arm portion 115 side when laterally opening the cellular telephone device shown in FIG. 15, the protrusions 123a and 123b of the thrust cam 116 are fit into the fitting recesses of the longitudinal opening arm portion 115, and the opening angle when laterally opening the cellular telephone device is restricted to approximately 130 degrees, for example.

Configuration of Stopper

Figure 24:
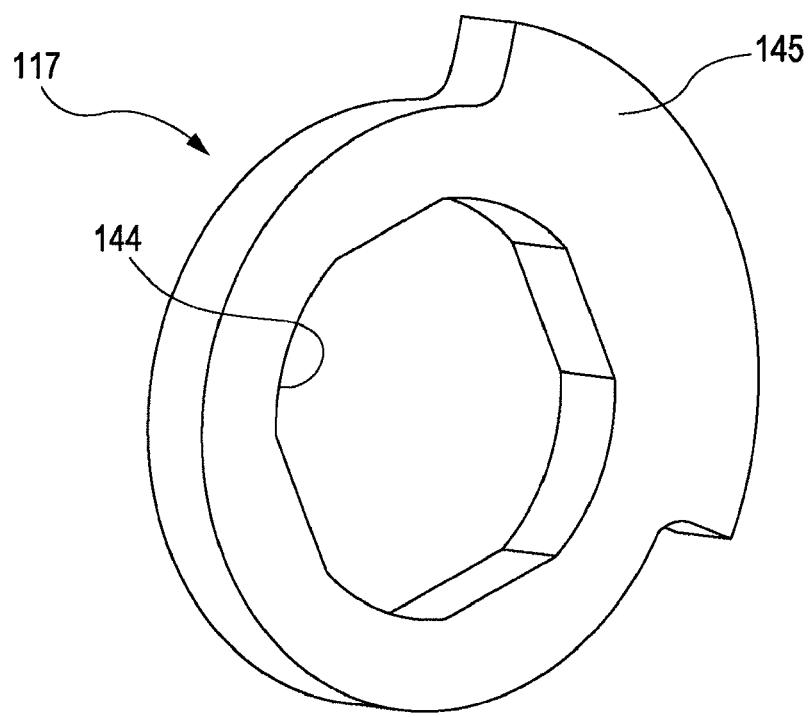
FIG. 24 is a perspective view of a stopper provided to the biaxial hinge portion of the cellular telephone device according to the second embodiment.

Next, FIG. 24 is a perspective view of the stopper 117. As can be seen from FIG. 24, the stopper 117 has a generally disc-shape having a shaft inserting hole portion 144 wherein the first shaft member 111 is inserted. The shaft inserting hole portion 144 has a polygonal shape. As will be described later, a portion processed into a polygonal shape of the first shaft member 111 is inserted into the shaft inserting hole portion 144. Therefore, the stopper 117 is turnable along the turning direction of the first shaft member 111.

Also, a fan-shaped stopper piece 145 is provided to the stopper 117 along a portion of the outer circumference. In other words, the stopper 117 has a fan-shaped stopper piece 145 protruding from a portion of the outer circumference. In the event that the opening angle when longitudinally opening the cellular telephone device becomes roughly 170 degrees, the stopper piece 145 of the stopper 117 comes into contact with a stopper contact face portion (unshown) provided on the lower housing 102, thereby restricting the opening angle when longitudinally opening the cellular telephone device to roughly 170 degrees.

Note that in this example, the stopper contact face portion with which the stopper piece 145 of the stopper 117 comes into contact is provided to the lower housing 102 side, but an arrangement may be made wherein the stopper contact face portion may be provided as to the longitudinal opening arm portion 115. In this case also, the opening angle when longitudinally opening the cellular telephone device can be restricted to roughly 170 degrees.

Configuration of Lateral Opening Mechanism

Next, the lateral opening mechanism 114 which causes the cellular telephone device to be in a laterally open state, as shown in FIG. 15, is a mechanism wherein the second shaft member 113 is a rotational shaft as shown in FIG. 16, and is made up with the lateral opening arm portion 146 which is screwed to the upper housing 101 and the slide control cam 147 to control the movement of the slide key 137 along the lengthwise direction of the first shaft member 111 being provided as to the second shaft member 113.

Configuration of Lateral Opening Arm Portion

Figure 25:
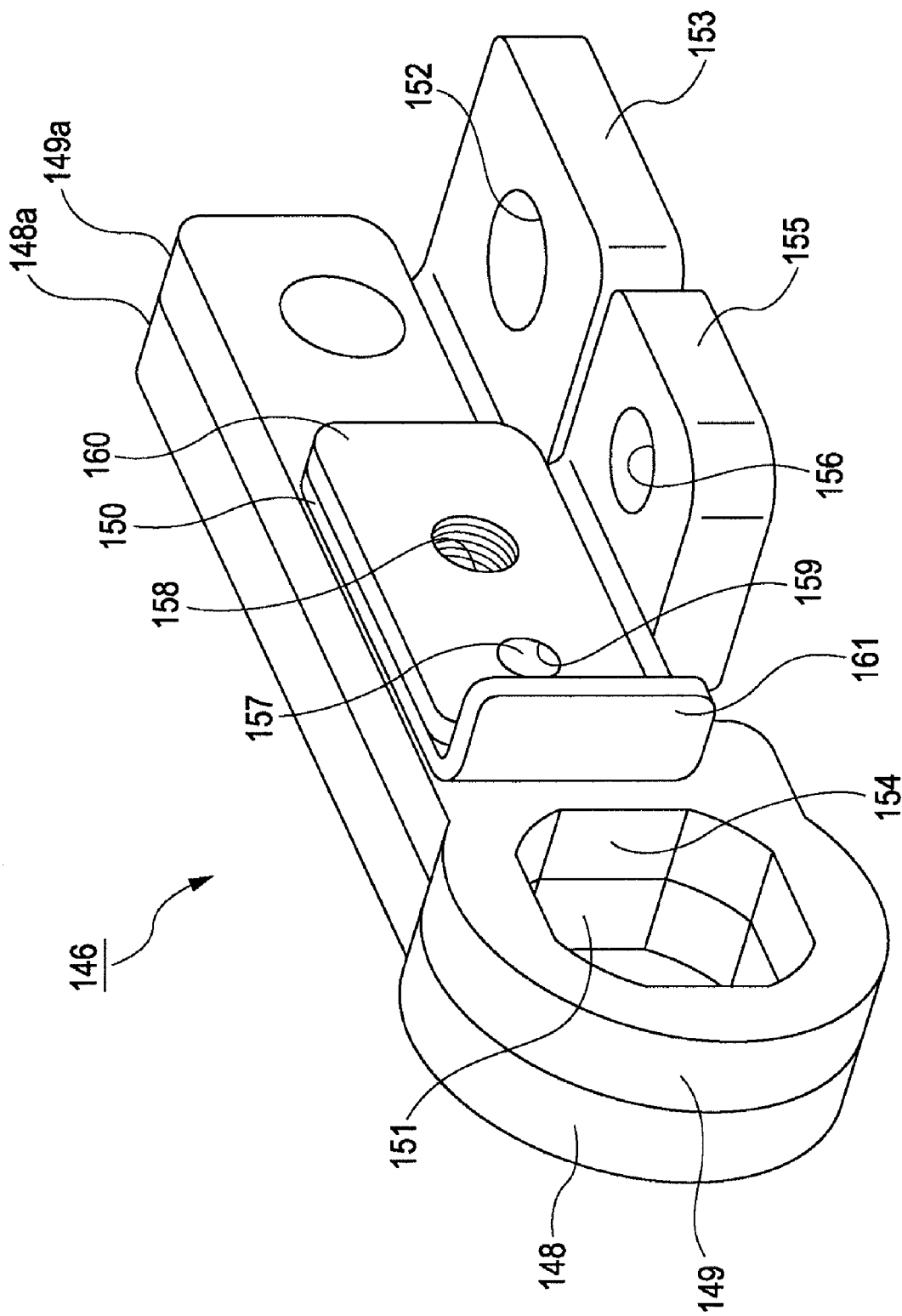
FIG. 25 is a perspective view of a lateral opening arm portion provided to the biaxial hinge portion of the cellular telephone device according to the second embodiment.

FIG. 25 shows a perspective view of the lateral opening arm portion 146. As can be seen from FIG. 25, the lateral opening arm portion 146 has a first arm piece 148, second arm piece 149, and stopper piece 150.

The first arm piece 148 has a shape connecting a rectangular rod-shaped member to a portion of the outer circumferential portion of the disc member having the polygonal shaped cam inserting hole portion 151. The rod-shaped member of the first arm piece 148 has two screw holes passing through from one side face portion to the other side face portion with a predetermined spacing therebetween.

Similarly, the second arm piece 149 has a shape connecting a rectangular rod-shaped member to a portion of the outer circumferential portion of the disc member having the polygonal shaped cam inserting hole portion 154 which has the same diameter as the cam inserting hole portion 151 provided to the first arm piece 148. The rod-shaped member of the second arm piece 149 has two screw holes passing through from one side face portion to the other side face portion with a predetermined spacing therebetween.

As will be described later, the first arm piece 148 and second arm piece 149 are provided such that the cam inserting hole portions 151 and 154 and the rod-shaped member are layered together, as shown in FIG. 25. Thus, the two screw holes provided to the rod-shaped member on the first arm piece 148 and the two screw holes provided to the second arm piece 149 are each provided at the same position on each rod-shaped member so as to form a single screw hole that passes through in the event of layering the first arm piece 148 and second arm piece 149 as described above.

Next, as shown in FIG. 25, an L-shaped screw member 153 is screwed in, via each of the screw hole provided near one end portion 148*a* of the rod-shaped member of the first arm piece 148 (i.e. the end portion on the opposite side as to the end portion to which the disc member is connected) and the screw hole provided near one end portion 149*a* of the rod-shaped member of the second arm piece 149 (i.e. the end portion on the opposite side as to the end portion to which the disc member is connected), as shown in FIG. 15.

The screw member 153 is screwed to the rod-shaped members so as to protrude in the direction orthogonal as to the direction that each rod-shaped member extends. The screw member 153 has a screw hole 152, and the arm pieces 148 and 149 are screwed to the upper housing 101 via the screw hole 152 of the screw member 153.

Also, an L-shaped screw member 155 is screwed in, via each of the screw hole (i.e. the screw hole provided near the end portion to which the disc member is connected) provided at a predetermined spacing from the screw hole provided near one end portion 148*a* of the rod-shaped member of the first arm piece 148 (i.e. the end portion on the opposite side as to the end portion to which the disc member is connected) and the screw hole (i.e. the screw hole provided near the end portion to which the disc member is connected) provided at a predetermined spacing from the screw hole provided near one end portion 149*a* of the rod-shaped member of the first arm piece 149 (i.e. the end portion on the opposite side as to the end portion to which the disc member is connected), as shown in FIG. 15.

The screw member 155 is screwed to the rod-shaped members so as to protrude in the direction orthogonal as to the direction that each rod-shaped member extends, and so as to be adjacent to the screw member 153. The screw member 155 has a screw hole 156, and the arm pieces 148 and 149 are screwed to the upper housing 101 via the screw hole 156 of the screw member 155.

That is to say, with the lateral opening arm portion 146, the screw members 153 and 155 are screwed to the respective rod-shaped members, via each screw hole provided near the end portions 148*a* and 149*a* of the first arm piece 148 and second arm piece 149 respectively, and via each screw hole provided near the end portions connected to the disc member, whereby the screw members 153 and 155 are each screwed to the respective rod-shaped members, while the first arm piece 148 and second arm piece 149 are linked in a state of being layered together as shown in FIG. 25.

Also, a protruding portion 157 protruding in the generally vertical direction from the side face portion of the rod-shaped member is provided to the rod-shaped member of the second arm piece 149, between the screw hole provided near the end portion to which the disc member is connected and the disc member. The protruding portion 157 serves as a position-determining and fixing protruding portion for the stopper piece 150 to be described below.

That is to say, as shown in FIG. 25, the stopper piece 150 has a generally rectangular flat-shaped fixing piece 160, and a stopper contact face portion 161 which has a generally rectangular flat shape somewhat smaller than the fixing piece 160 and which is to restrict the opening angle when laterally opening to roughly 130 degrees, by making contact with the stopper provided on the second shaft member 113 in the event that the opening angle when laterally opening the cellular telephone device becomes roughly 130 degrees, so as to be formed integrally such that the entire unit is in a generally L-shaped form.

The fixing piece 160 has a screw hole 158 to screw the stopper piece 150 to the second arm piece 149, and a protrusion inserting hole portion 159 to determine the position of the stopper piece 150 as to the second arm piece 149 and also to fix the stopper piece 150 to the second arm piece 149.

The stopper piece 150 determines the position of the protrusion inserting hole portion 159 of the fixing piece 160 as to the arm pieces 148 and 149, by inserting the protruding portion 157 provided to the rod-shaped member of the second arm piece 149. With the stopper piece 150, the screws inserted via the screw holes provided near the disc members of the arm pieces 148 and 149 are inserted in the screw hole 158 of the fixing member 160 in such position-determined state, thereby being fixed to the arm pieces 148 and 149.

Configuration of Slide Control Cam

Next, FIG. 26 is a perspective view of the slide control cam 147. As can be seen from FIG. 26, the slide control cam 147 is integrally formed so as to connect to the upper face portion of a disc-shaped slide control ring 163 for controlling the sliding motion of the slide key 137, as to the cylindrical inserting portion 162 that is inserted into the second shaft member 113.

The slide control ring 163 has a hole portion 164 that passes from the upper face portion which is the face portion connected to the inserting portion 162 through to the bottom face portion which is the face portion on the opposite side as to the upper face portion. The diameter of the hole portion 164 of the slide control ring 163 has the same diameter as the diameter of the hole portion 165 of the cylindrical inserting portion 162. The inserting portion 162 and the slide control ring 163 are connected such that the hole portion 165 of the inserting portion 162 and the hole portion 164 of the slide control ring 163 are lined up to allow communication. As will be described later, the hole portion 164 of the slide control ring 163 and the hole portion 165 of the inserting portion 162 which are lined up together serve as a hole portion to insert a cable.

Also, a portion of the outer circumference portion of the slide control ring 163 is cut off in a straight line. Thus, a distance r1 from the center P of the hole potion 164 of the slide control ring 163 to the portion cut off in a straight line, and a distance r2 from the center P to the portion not cut off in a straight line are different. That is to say, the distance r1 from the center P to the portion cut off in a straight line is a shorter distance than the distance r2 to the portion not cut off in a straight line (P–r1<P–r2).

With such a slide control ring 163, the portion that a portion of the outer circumference portion is cut off in a straight line is a first contact face portion 166, which comes into contact with the slide key 137 when the cellular telephone device is in a closed state and when in an open state, whereby the slide key 137 is controlled to move to the connecting portion side of the first and second shaft members 111 and 113, and the thrust cam 116 is controlled to move to the connecting portion side of the first and second shaft members 111 and 113 via the slide key 137. Also, with the slide control ring 163, the portion that a portion of the outer circumference portion is not cut off in a straight line is a second contact face portion 167, which comes into contact with the slide key 137 when the cellular telephone device is in a laterally opened state, whereby the slide key 137 is controlled to move to the longitudinal opening arm portion 115 side and the thrust cam 116 is controlled to move to the longitudinal opening arm portion 115 via the slide key 137. The motion control operations of the slide key 137 and thrust cam 116 will be described in detail below.

Next, the outer circumference portion of the inserting portion 162 of the slide control cam 147 is subjected to processing to reduce friction resistance overall, but the portion near the end portion which is the opposite side as to the end portion connected to the slide control ring 163 is subjected to processing such that the relevant portion is in a polygonal shape. The portion of the inserting portion 162 subjected to such polygonal shaping is an arm mounting portion 168 that is inserted in each of the cam inserting holes 151 and 154 of the respective arm pieces 148 and 149 of the lateral opening arm portion 146 (see FIG. 25).

The slide control cam 147 is inserted into a slide control cam inserting hole portion 169 of the second shaft member 113 from the slide control cam inserting hole portion 169 of the connecting portion side of the first and second shaft members 111 and 113 shown in FIGS. 17, 22, and 23, with the arm mounting portion 168 at the lead thereof. With this insertion, the slide control ring 163 of the slide control cam 147 comes into contact with the end portion of the connecting portion sides of the shaft members 111 and 113 of the slide control cam inserting hole portion 169, whereby the arm mounting portion 168 of the slide control cam 147 protrudes from the end portion on the opposite side as to the end portion of the connecting portion sides of the shaft members 111 and 113 of the slide control cam inserting hole portion 169. The protruding arm mounting portion 168 is inserted into the cam inserting hole portions 151 and 154 of the respective arm pieces 148 and 149 of the lateral opening arm portion 146 as shown in FIG. 16, whereby the slide control cam 147 and lateral opening arm portion 146 is provided as to the second shaft member 113.

The outer circumference portion of the inserting portion 162 of the slide control cam 147 is subjected to processing to reduce friction resistance overall, and the arm mounting portion 168 is subjected to polygonal shaping such that the outer circumference thereof is in a polygonal shape. Therefore, upon the lateral opening arm portion 146 turning when the cellular telephone device is laterally opened or closed, the slide control cam 147 within the second shaft member 113 also turns along with the turning of the lateral opening arm portion 146. Upon the slide control cam 147 turning, the contact face portion of the slide control ring 163 which comes in contact with the slide key 137 shown in FIG. 16 is modified from the first contact face portion 166 to the second contact face portion 167, or is modified from the second contact face portion 167 to the first contact face portion 166.

With the slide control cam 147, the thrust cam 116 is controlled to move to the connecting portion side of the first and second shaft members 111 and 113 via the slide key 137, by changing the contact face portion that comes into contact with the slide key 137 (i.e. the first contact face portion 166 or second contact face portion 167), or the thrust cam 116 is controlled to move to the longitudinal opening arm portion 115 side via the slide key 137.

Also, with the second shaft member 113, a stopper 170 that protrudes in the external direction from the outer circumference of the second shaft member 113 is provided near the end portion on the opposite side as to the connecting end portion between the second shaft member 113 and first shaft member 111, as shown in FIGS. 17 and 23.

In the event that the opening angle of the cellular telephone device when laterally opening is roughly 130 degrees for example, the stopper 170 of the second shaft member 113 is provided on the second shaft member 113 so as to make contact with the stopper contact face portion 161 of the stopper piece 150 on the lateral opening arm portion 146 shown in FIG. 25. With the cellular telephone device herein, the stopper 170 of the second shaft member 113 comes into contact with the stopper contact face portion 161, while the protrusions 123a and 123b of the thrust cam 116 are engaged with the fitting recesses 124 of the longitudinal opening arm portion 115, whereby the opening angle when laterally opening the cellular telephone device can be restricted to roughly 130 degrees.

Assembly Method of Biaxial Hinge Portion

An assembly method of such a biaxial hinge portion 103 will now be described.

Assembly Method of Longitudinal Opening Mechanism

First, in the case of assembling the longitudinal opening mechanism 112 of the biaxial hinge portion 103, the various inserting pieces 142 of the slide key 137 are inserted into the slide groves 143 provided on the shaft connecting member 100 as shown in FIG. 22.

Next, the first shaft member 111 is inserted into the shaft inserting hole portion 118 of the thrust cam 116 shown in FIG. 18A, with the bottomed face portion 119 of the thrust cam 116 at the lead thereof. In this event, the thrust cam 116 is provided to the first shaft member 111 so that the cutout portion 122 provided to the protrusions 121b of the thrust cam 116 shown in FIG. 18A is on the cable 171 side shown in FIG. 16. The location that the thrust cam 116 is mounted is the location that the outer circumference of the first shaft member 111 shown in FIG. 22 is subjected to polygonal shaping. As described above, the outer circumference of the shaft inserting hole portion 118 of the thrust cam 116 is subjected to polygonal shaping processing, whereby the thrust cam 116 is provided to the first shaft member 111 in a state of not being turnable.

Next, the first shaft member 111 is inserted in the hole portion of the disc-shaped disc spring, whereby one or multiple disc springs are provided to the first shaft member 111. The diameter of each disc spring is somewhat smaller than the diameter of the thrust cam 116 shown in FIG. 18B. Therefore, the disc springs provided to the first shaft member 111 are each provided to the first shaft member 111 so as to be stored within the thrust cam 116. Also, the hole portions of the disc springs are subjected to polygonal shaping to match the outer circumference of the first shaft member 111 subjected to polygonal shaping. The disc springs are thus provided to the first shaft member 111 in a non-turnable state.

Next, the first shaft member 111 is inserted into the shaft inserting hole portion 133 of the click cam 132 shown in FIG. 20. In this event, the click cam 132 is mounted on the first shaft member 111 such that the cam face portion 134 of the click cam 132 faces the thrust cam facing face portion 129 of the longitudinal opening arm portion 115 shown in FIG. 19.

The diameter of the click cam 132 is a diameter somewhat smaller than the diameter of the thrust cam 116 shown in FIG. 18B. Therefore, the click cam 132 provided to the first shaft member 111 is provided to the first shaft member 111 in a form to be stored within the thrust cam 116. Also, the shaft inserting hole portion 133 of the click cam 132 is subjected to polygonal shaping to match the outer circumference of the first shaft member 111 which has been subjected to polygonal shaping. Therefore, the click cam 132 is provide to the first shaft member 111 in a non-turnable state.

Next, the first shaft member 111 is inserted in the shaft inserting hole portion 127 of the longitudinal opening arm portion 115 shown in FIG. 19. The longitudinal opening arm portion 115 is mounted to the portion of the outer circumference of the first shaft member 111 that has not been subject to polygonal shaping (the outer circumference portion that has been subject to processing to reduce friction resistance), as shown in FIG. 22. Also, processing to reduce friction resistance is performed on the outer circumference of the shaft inserting hole portion 127 of the longitudinal opening arm portion 115. Thus, the longitudinal opening arm portion 115 is provided to the first shaft member 111 so as to be freely turnable.

Note that upon the longitudinal opening arm portion 115 being mounted on the first shaft member 111, the protrusions 135 provided to the cam face portion 134 of the click cam 132 and the recesses 131 provided to the thrust cam facing face portion 129 of the longitudinal opening arm portion 115 are in an engaged state, and the recesses 136 provided to the cam face portion 134 of the click cam 132 and the protrusions 130 provided to the thrust cam facing face portion 129 of the longitudinal opening arm portion 115 are in an engaged state.

Next, the first shaft member 111 is inserted in the shaft inserting hole portion 144 of the stopper 117 shown in FIG. 24. The shaft inserting hole portion 144 of the stopper 117 is subjected to polygonal shaping, and is provided to the portion that is subjected to polygonal shaping near the end portion of the outer circumference of the first shaft member 111 shown in FIG. 22. The stopper 117 is thus provided to the first shaft member 11 in a non-turnable state. Also, the stopper 117 is provided to the first shaft member 111 so that the stopper piece 145 of the stopper 117 comes in contact with the stopper contact face portion provided to the longitudinal opening arm portion 115 or the lower housing 102 in the event that the opening angle when longitudinally opening the cellular telephone device becomes roughly 170 degrees, for example.

Next, the washer stopper is attached to the first shaft member 111 after the slide key 137, thrust cam 116, disc spring, click cam 132, longitudinal opening arm portion 115, and stopper 117 are mounted sequentially on the first shaft member 111. Thus, the slide key 137, thrust cam 116, disc spring, click cam 132, longitudinal opening arm portion 115, and stopper 117 are in a state of being mounted to the first shaft member 111 after the positions thereof being determined, whereby the longitudinal opening mechanism 112 shown in FIG. 16 is assembled.

Assembly Method of Lateral Opening Mechanism

Next, in the case of assembling the lateral opening mechanism 114 of the biaxial hinge portion 103, the slide control cam 147 shown in FIG. 26 is inserted in the slide control cam inserting hole portion 169 of the second shaft member 113 shown in FIG. 23. In this event, the slide control cam 147 is inserted as to the slide control cam inserting hole portion 169 of the second shaft member 113 so that the first contact face portion 166 (the contact face portion having the shorter distance (r1) from the center P because of the cutout processing) of the slide control cam 147 comes into contact with the slide key 137. Thus, the arm mounting portion 168 which is the outer circumference portion subjected to polygonal shaping of the slide control cam 147 protrudes from the one end portion 113a of the second shaft member 113 shown in FIG. 17.

Next, the arm mounting portion 168 of the slide control cam 147 protruding from the one end portion 113a of the second shaft member 113 is inserted in the cam inserting hole portions 151 and 154 of the respective arm pieces 148 and 149 of the lateral opening arm portion 146 shown in FIG. 25. In this event, the arm mounting portion 168 of the slide control cam 147 protruding from the one end portion 113a of the second shaft member 113 is inserted in the cam inserting hole portions 151 and 154 of the respective arm pieces 148 and 149 of the lateral opening arm portion 146, so that the stopper piece 150 of the lateral opening arm portion 146 shown in FIG. 25 faces the first shaft member 111.

The cam inserting hole portions 151 and 154 of the respective arm pieces 148 and 149 of the lateral opening arm portion 146 are subjected to polygonal shaping, and the arm mounting portion 168 of the slide control cam 147 are also subjected to polygonal shaping corresponding to the cam inserting hole portions 151 and 154. Thus, as the lateral opening arm portion 146 turns, the slide control cam 147 also turns.

Lastly, a washer stopper is mounted on the arm mounting portion 168 of the slide control cam 147 in a state wherein the arm mounting portion 168 of the slide control cam 147 protruding from the one end portion 113a of the second shaft member 113 is inserted in the cam inserting hole portions 151 and 154 of the respective arm pieces 148 and 149 of the lateral opening arm portion 146. Thus, the slide control cam 147 and lateral opening arm portion 146 are in a state of being mounted to the second shaft member 113 after the positions thereof determined, whereby the lateral opening mechanism 114 shown in FIG. 16 is assembled.

Assembly Method of Housing of Biaxial Hinge Portion

An assembly method of the housing 101 and 102 of such a biaxial hinge portion 103 will be described next. In the case of assembling the biaxial hinge portion 103 to the housing 101 and 102, first, the longitudinal opening arm portion 115 is screwed to the lower housing 102 via screw holes 125 provided to the attaching portion 126 of the longitudinal opening arm portion 115 provided to the first shaft member 113 as shown in FIGS. 13 through 15.

The lateral opening arm portion 146 is then screwed to the upper housing 101 via the screw holes 152 and 156 of the respective screw members 153 and 155 provided to the respective arm pieces 148 and 149 of the lateral opening arm portion 146, as shown in FIGS. 14 and 15. The biaxial hinge portion 103 is thus assembled as to the housings 101 and 102 of the cellular telephone device.

Opening/Closing Operations of Cellular Telephone

Next, the opening/closing operations of the cellular telephone according to the second embodiment, based the biaxial hinge portion 103 such as described above, will be described.

State of Biaxial Hinge Portion When in Closed State

First, the state of the biaxial hinge portion 103 when the cellular telephone device is in a closed state that the upper housing 101 and lower housing 102 are generally layered upon one another, as shown in FIG. 13, will be described.

In the case that the cellular telephone device is in a closed state, the thrust cam 116 moves in the direction of the connecting end portions of the first and second shaft members 111 and 113 with the pressing force of the disc springs provide in the thrust cam 116. Also, the slide key 137 is also pressed in with the thrust cam 116 that is pressed in the direction of the connecting end portions of the first and second shaft members 111 and 113 with the pressing force of the disc springs, and the slide key 137 also moves in the direction of the connecting end portions of the first and second shaft members 111 and 113.

As described with reference to FIG. 26, the distance r1 from the center P of the slide control ring 163 of the slide control cam 147 to the first contact face portion 166 is a shorter distance than the distance r2 from the center P2 to the contact face portion 167. Also, when the cellular telephone device is in a closed state, the first contact face portion 166 which is the contact face portion with the shorter distance from the center P2 faces the slide key 137. Thus, as shown in FIG. 16, the slide key 137 comes in contact with the first contact face portion 166 of the slide control ring 163 of the slide control cam 147 at a position close to the connecting end portion of the first and second shaft member 111 and 113. Also, the thrust cam 116 moves to a position close to the connecting end portions of the first and second shaft members 111 and 113.

Thus, the protrusions 123a and 123b of the thrust cam 116 and the fitting recesses 124 of the longitudinal opening arm portion 115 are in a disengaged sate, and conversely, the protrusions 121a and 121b of the thrust cam 116 and the fitting recesses 111b provided to the shaft connecting member 100 shown in FIG. 17 are in an engaged state.

In this state, the protrusions 123a and 123b of the thrust cam 116 and the fitting recesses 124 of the longitudinal opening arm portion 115 are in a disengaged state, whereby the thrust cam 116 can turn in the longitudinal opening direction of the cellular telephone device along with the turning of the first shaft member 111.

Also, the stopper contact face portion 161 of the stopper piece 150 of the lateral opening arm portion 146 shown in FIG. 25 is in a state not in contact with the stopper 170 of the second shaft member 113 as shown in FIG. 16, whereby the lateral opening arm portion 146 can turn in the longitudinal opening direction of the cellular telephone device.

Longitudinal Opening Operation

Next, the operation of the biaxial hinge portion 103 in the event that the cellular telephone device moves from the closed state to the longitudinal opening state shown in FIG. 14 will be described. In the case of moving the cellular telephone device to the longitudinal opening state, the user grasps the upper housing 101 with the right hand, for example, grasps the lower housing 102 with the left hand, and applies force to the upper housing 101 such that the right hand is pressed upward. Thus, the first shaft member 111 of the biaxial hinge portion 103 turns in the longitudinal opening direction shown in FIG. 16.

Also, in the case that the cellular telephone device is in a closed state, the protrusions 123a and 123b of the thrust cam 116 and the fitting recesses 124 of the longitudinal opening arm portion 115 are in a disengaged state as described above, and the protrusions 121a and 121b of the thrust cam 116 and the fitting recesses 111b of the first shaft member 111 are in an engaged state, and additionally the shaft inserting hole portion 118 of the thrust cam 116 is subjected to polygonal shaping, whereby the thrust cam 116 turns in the longitudinal opening direction of the cellular telephone device along with the turning of the first shaft member 111.

Further, the shaft inserting hole portion 144 of the stopper 117 and the shaft inserting hole portion 133 of the click cam 132 are subjected to polygonal shaping, whereby the stopper 117 and click cam 132 also turn in the longitudinal opening direction along with the turning of the first shaft member 111.

In the event that the opening angle of the housings 101 and 102 when longitudinally opened is roughly 170 degrees for example, the stopper 117 turning along with the first shaft member 111 comes in contact with the stopper contact face portion provided to the lower housing 102 or longitudinal opening arm portion 115. Thus, the opening angle of the housings 101 and 102 is restricted to roughly 170 degrees for example, and the cellular telephone device is in the longitudinally opened state shown in FIG. 14.

Note that the cam face portion 134 of the click cam 132 is pressed to the thrust cam facing face portion 129 of the longitudinal arm portion 115 by the disc spring provided within the thrust cam 116. Upon the click cam 132 turning along with the first shaft member 111, the protrusions 135 and recesses 136 provided to the cam face portion 134 of the click cam 132 and the protrusions 130 and recesses 131 provided in the thrust cam facing face portion 129 of the longitudinal arm portion 115 repeatedly engage and disengage according to the turning state of the first shaft member 111. Thus, in the event that the protrusions 135 provided to the cam face portion 134 of the click cam 132 and the recesses 131 provided to the thrust cam facing face portion 129 of the longitudinal arm portion 115 are engaged, and in the event that the recesses 136 provided to the cam face portion 134 of the click cam 132 and the protrusions 130 provided to the thrust cam facing face portion 129 of the longitudinal opening arm portion 115 are engaged, according to the turning state of the first shaft member 111 when longitudinally opening the cellular telephone device, a so-called clicking sound of "click" occurs.

Also, in the event that the cellular telephone device is in the longitudinally opened state, in the case that the user applies force to the upper housing 101 (or lower housing 102) so that the cellular telephone device is in the laterally opened state, the protrusions 121a and 121b of the thrust cam 116 shown in FIG. 18A are engaged with the fitting recesses 111b provided to the shaft connecting unit 100, whereby lateral opening of the cellular telephone device when longitudinally opened is restricted, and the trouble of the biaxial hinge portion 103 being damaged can be prevented in the event of force applied to open the cellular telephone device in a laterally-opened state when the cellular telephone device is in a longitudinally opened state.

Lateral Opening Operation

Next, description will be made regarding the operation of the biaxial hinge portion 103 in a case of opening the cellular telephone from the closed state. In this case, the user places the cellular telephone device on the palm of the left hand for example in a horizontally long state so that the biaxial hinge portion 103 assumes an upper position, holds the upper housing 101 with the right hand, and holds the lower housing 102 with the left hand, and applies force to the upper housing 101 while pushing the right hand upwards. This turns the lateral opening arm portion 146 and slide control cam 147 provided to the second shaft member 113 in the lateral direction shown in FIG. 16 with the second shaft member 113 of the biaxial hinge portion 103 serving as a rotational shaft.

As described above, when the cellular telephone device is in the closed state or longitudinally open state, the first contact face portion 166 (face portion where the distance (r1) from the center P is shorter) of the slide control cam 147 shown in FIG. 26 comes in contact with the slide key 137, but when the slide control cam 147 is turned in the lateral opening direction when the cellular telephone device is laterally opened, the second contact face portion 167 (face portion where the distance (r2) from the center P is longer) of the slide control cam 147 comes in contact with the slide key 137.

That is to say, the slide control cam 147 turns in the laterally opening direction when the cellular telephone device is laterally opened, whereby the face portion making contact with the slide key 137 is converted from the first contact face portion 166 to the second contact face portion 167. Upon the face portion making contact with the slide key 137 is converted to the second contact face portion 167, the second contact face portion 167 has a longer distance from the center P than the first contact face portion 166, whereby the slide key 137 moves in the direction of the longitudinal opening arm portion 115 shown in FIG. 16 against the pressing force of the disc plate provided within the thrust cam 116.

Upon the slide key 137 moving in the direction of the longitudinal opening arm portion 115, the thrust cam 116 also moves in the direction of the longitudinal opening arm portion 115 against the pressing force of the disc spring with the slide key 137. In the event that the opening angle when laterally opening the cellular telephone device is roughly 130 degrees for example, the protrusions 123a and 123b of the thrust cam 116 that is moved in the direction of the longitudinal opening arm portion 115 are fitted with the fitting recesses 124 of the longitudinal opening arm portion 115.

On the other hand, when the cellular telephone device is laterally opened, the lateral opening arm portion 146 shown in FIG. 16 also is rotated in the lateral opening direction, but in the event that the opening angle when the cellular telephone device is laterally opened is roughly 130 degrees for example, the stopper contact face portion 161 of the stopper piece 150 provided to the lateral opening arm portion 146 (see FIG. 25) comes in contact with the stopper 170 provided to the second shaft member 113.

In the case of such a cellular telephone device, when laterally opening, the protrusions 123a and. 123b of the thrust cam 116 that moves in the direction of the longitudinal opening arm portion 115 are fitted with the fitting recesses 124 of the longitudinal opening arm portion 115, while the stopper contact face portion 161 of the stopper piece 150 provided to the lateral opening arm portion 146 comes in contact with the stopper 170 provided to the second shaft member 113, whereby the opening angle at the time of laterally opening is restricted to roughly 130 degrees, for example. Thus, the cellular telephone device is in the laterally opened state shown in FIG. 15.

Note that in the event that the cellular telephone device is in the laterally opened state, in the case that the user applies force to the upper housing 101 (or lower housing 102) to open the cellular telephone device in a longitudinally opened state, the protrusions 123a and 123b of the thrust cam 116 shown in FIG. 18A are fitted in the fitting recesses 124 of the longitudinal opening arm portion 115 provided to the first shaft member 111, whereby longitudinally opening the cellular telephone device when laterally opened is restricted, and the trouble of the biaxial hinge portion 103 being damaged can be prevented in the event of force applied to open the cellular telephone device in a longitudinally opened state when the cellular telephone device is in a laterally opened state.

Cable Passage Configuration

The biaxial hinge portion 103 which enables such longitudinal opening and lateral opening has a cable 171 passing as shown in FIG. 16, via the hole portion 164 of the slide control cam 147 inserted in the cylindrically shaped first shaft member 111 and the cylindrically shaped second shaft member 113.

Specifically, the biaxial hinge portion 103 connects the cylindrically shaped first and second shaft members 111 and 113 so as to form a general L-shape, as shown in FIGS. 17, 22, and 23. Also, the cylindrically shaped slide control cam 147 described with reference to FIG. 26 is inserted in the second shaft member 113. Thus, a hole portion communicating in the general L-shape is formed within the biaxial hinge portion 103.

With the cellular telephone device according to the second embodiment, one or several cables 171 are passed through the hole portion communicating in the general L-shape therein. Thus, for example an electrical part such as a display portion provided to the upper housing 101 side and an electrical part such as a circuit board provided on the lower housing 102 can be mutually electrically connected with the cables 117 via the shaft members 111 and 113. Also, the cable 117 can be passed via the shaft members 111 and 113, thereby preventing trouble such as fraying or disconnecting of the cable 90 when operating the longitudinal opening or operating the lateral opening of the cellular telephone device.

Cable Wedging Preventing Mechanism

When closing or longitudinally opening the cellular telephone device, the protrusions 121a and 121b of the thrust cam 116 and the fitting recesses 111b provided to the shaft connection member 100 shown in FIG. 17 are each fit together, but of the protrusions 121a and 121b of the thrust cam 116, a cutout portion 122 is provided to the protrusion 121b, as described with reference to FIG. 18A, which equates to the cable 171 side passed within the biaxial hinge portion 103 as shown in FIG. 16.

Thus, even in the case that the protrusions 121a and 121b of the thrust cam 116 and the fitting recesses 111b of the first shaft member 111 are in an engaged state when the cellular telephone device is in a closed state or in a longitudinally opened state, the passed cable 171 can be prevented from being wedged with the cutout portion 122.

Advantages of Second Embodiment

As is clear from the above description, with the cellular telephone device according to the second embodiment, the thrust cam 116 provided to the first shaft member 111 is pressed in the direction of the connecting end portions of the shaft members 111 and 113 with the disc spring (alternatively, a spring or plate spring may be used) provided within the thrust cam 116.

Also, the slide key 137 to control movement of the thrust cam 116 along the extended direction of the first shaft member 111 comes in contact with the thrust cam 116 and is provided to the first shaft member 111, while a slide control cam 147 is provided to the second shaft member 113 wherein the first contact face portion 166 having a short distance from the center P comes in contact with the slide key 137 "when longitudinally opening and when in a closed state" of the cellular telephone device, and the second contact face portion 167 having a long distance from the center P comes in contact with the slide key 137 "when laterally opening" the cellular telephone device.

"When longitudinally opening and when in a closed state" of the cellular telephone device, the first contact face portion 166 of the slide control cam 147 comes in contact with the slide key 137, whereby the thrust cam 116 is moved to the connecting end portion side of the shaft members 111 and 113, the protrusions 123a and 123b of the thrust cam and the fitting recesses 124 provided to the longitudinal opening arm portion 115 are disengaged so as to enable the biaxial hinge portion to turn, while also in the event that the opening angle of the housings 101 and 102 when in a longitudinally opened state is roughly 170 degrees, the stopper 117 provided to the first shaft member 111 comes in contact with the stopper contact face portion provided to the lower housing 102 or longitudinal opening arm portion 116, and the opening angle of the housings 101 and 102 when longitudinally opening is restricted to roughly 170 degrees.

Also, "when laterally opening" the cellular telephone device, the second contact face portion 167 of the slide control cam 147 comes in contact with the slide key 137, whereby the thrust cam 116 is moved to the longitudinal opening arm portion 115 side, and in the event that the opening angle of the housings 101 and 102 when laterally opening is roughly 130 degrees, the protrusions 123a and 123b of the thrust cam 116 and the fitting recesses provided to the longitudinal opening arm portion 115 are engaged, while the stopper contact face portion 161 of the stopper piece 150 provided to the lateral opening arm portion 146 comes in contact with the stopper 170 provided to the second shaft member 113, and the opening angle of the housings 101 and 102 when laterally opening is restricted to roughly 130 degrees.

Thus, turning position restrictions in the longitudinal opening direction of the cellular telephone device and turning position restrictions in the lateral opening direction can be made using the disc spring provided only on the first shaft member 111 side. That is to say, with the related art, a spring which had been necessary for the turning position restrictions in each of the longitudinal opening direction and lateral opening direction can now handle restrictions with one spring (the above-mentioned disc spring). Therefore, the design space which had been necessary for two springs worth can be reduced to the design space only for the disc spring. Accordingly, the biaxial hinge portion 103 itself can be miniaturized, whereby the cellular telephone device according to the second embodiment wherein the biaxial hinge portion 103 is set can be miniaturized.

Also, in the case of the biaxial hinge portion 103 of the cellular telephone device according to the first embodiment, motion control of the thrust cam 70 is performed with the two small-diameter ring-shaped members 53 provided to the rotation restricting cam members 52 as shown in FIG. 7. Conversely, in the case of the biaxial hinge portion 103 of the cellular telephone device according to the second embodiment, motion of the thrust cam 116 along the extended direction of the first shaft member 111 is controlled with one plate-shaped slide key 137 and one slide control cam 147 of which the face portion that comes in contact with the slide key 137 changes between when longitudinally opened (and when in a closed state) and when laterally opened. Therefore, the biaxial hinge portion 103 provided to the cellular telephone device according to the second embodiment can use fewer parts than the biaxial hinge portion 103 provided to the cellular telephone device according to the first embodiment, whereby the configuration thereof can be simplified. Accordingly, with the reduction in number of parts and the simplification of the configuration, the biaxial hinge portion 103 can be further miniaturized.

Also, in the case of the biaxial hinge portion 103 of the cellular telephone device according to the first embodiment, a hinge fixing portion 51 to hold the drum-shaped rotation restricting cam members 52 and a fixing portion 23 of the arm portion 20 is necessary to fix the biaxial hinge portion 3 to the housings 1 and 2, but in the case of the biaxial hinge portion 103 of the cellular telephone device according to the second embodiment, the attaching portions 126 of the longitudinal opening arm portion 115 shown in FIG. 19 and the biaxial hinge portion 103 as to the housings 101 and 102 can be fixed with the screw members 153 and 155 provided to the lateral opening arm portions 146 shown in FIG. 25.

That is to say, the biaxial hinge portion 103 of the cellular telephone device according to the second embodiment can have a smaller fixing member to fix the biaxial hinge portion 103 as to the housings 101 and 102 than the biaxial hinge portion 103 of the cellular telephone device according to the first embodiment, thereby enable further miniaturization of the biaxial hinge portion 103.

Also, the biaxial hinge portion inevitably has a large exterior, whereby the biaxial hinge portion protrudes (sticks out) from the housing face of the cellular telephone device housing, and design of the cellular telephone device housing is thereby restricted.

However, according to a cellular telephone device provided with a prototype of the biaxial hinge portion 103 provided to the cellular telephone device according to the second embodiment that is created by the present inventor, in the case of the biaxial hinge portion 103 provided to the cellular telephone device according to the second embodiment, large-scale miniaturization such as described above can be made, whereby the biaxial hinge portion 103 described above can be provided on the same face as the housing face of the cellular telephone device housing, and the biaxial hinge portion 103 protruding (sticking out) from the housing can be prevented.

This means that the external view of the cellular telephone device provided with the biaxial hinge portion 103 can be the same external view of a cellular telephone device with a single-shaft hinge portion. Therefore, the biaxial hinge portion 103 can greatly improve the design and freedom of design of the cellular telephone device housing.

Modifications

While the embodiments described above has been described regarding a cellular telephone, the present invention is by no way restricted to a cellular telephone, and may be applied to other devices such as PHS (Personal Handyphone System) telephone devices, PDA (Personal Digital Assistant) devices, portable game devices, digital camera devices, notebook computers, and so forth. In the case of any device, the advantages of longitudinally and laterally opening on the biaxial hinge portion 103 can be had in the same way as with that described above.

The present application contains subject matter related to that disclosed in Japanese Priority Patent Application JP 2008-057790 filed in the Japan Patent Office on Mar. 7, 2008, and Japanese Priority Patent Application JP 2009-012417 filed in the Japan Patent Office on Jan. 22, 2009, The above-described are to be understood to be only exemplarily embodiments of the present invention, and should not be interpreted restrictively. It should be understood by those skilled in the art that various modifications, combinations, sub-combinations and alterations may occur depending on design requirements and other factors insofar as they are within the scope of the appended claims or the equivalents thereof.

What is claimed is:

1. A biaxial hinge device comprising:
an approximately rod-shaped first shaft member;
an approximately rod-shaped second shaft member;
a shaft connecting member for connecting the first shaft member and the second shaft member such that the direction in which the first shaft member extends and the direction in which the second shaft member extends are approximately orthogonal;
an arm portion provided to the first shaft member so as to be turnable along the outer circumference of the first shaft member, the arm portion further including
 a fixing portion for fixation to a first housing, and
 a fitting recess provided along the direction in which the first shaft member extends;
a hinge fixing portion for fixation to a second housing, provided to the second shaft member so as to be turnable along the outer circumference of the second shaft member;
a thrust cam member provided to the first shaft member such that movement in the direction in which the first shaft member extends is enabled, the thrust cam member further including
 a fitting protrusion, provided at the end portion thereof toward the arm portion, for fitting into the fitting recess of the arm portion;
a spring member configured to press the thrust cam member in the direction of the second shaft member; and
a thrust cam motion control member including
 a first contact face portion, for moving the thrust cam member in the direction of the shaft connecting member; and
 a second contact face portion, for moving the thrust cam member in the direction of the arm portion,
 motion taking place by the first contact face portion and the second contact face portion directly or indirectly coming into contact with the thrust cam member;
wherein, in the event that the first housing and the second housing are in a closed state, the thrust cam member is moved in the direction of the shaft connecting member according to pressing force by the spring member with the first contact face portion, and the fitting protrusion of the thrust cam member and the fitting recess of the arm portion are disengaged from fitting, whereby each housing can turn supported by the first shaft member as a rotational shaft and together each housing can turn supported by the second shaft member as a rotational shaft, and in a case of turning supported by the second shaft member as a rotational shaft, the thrust cam member is moved in the direction of the arm portion so as to press against the pressing force of the spring member, whereby the fitting protrusion of the thrust cam member is fitted into the fitting recesses of the arm portion, and the turning angle of each housing supported by the second shaft member as a rotational shaft is restricted to a predetermined turning angle.

2. A biaxial hinge device according to claim 1, wherein the hinge fixing portion supports the second shaft member so as to be turnable,
and wherein the thrust cam motion control member is provided to the hinge fixing portion so as to be fixed to the hinge fixing portion.

3. A biaxial hinge device according to claim 1, further comprising:
a stopper provided so as to be fixed to an end portion side of the first shaft member which is an opposite side as to an end portion of the second shaft member; and
an arm side stopper to restrict the rotational position of the arm portion at a predetermined rotational position;
wherein the arm portion turns along the outer circumference of the first shaft member;
and wherein the arm portion comes in contact with the stopper in the event that a rotational position herein reaches a predetermined rotational position.

4. A biaxial hinge device according to claim 1; wherein the first shaft member has
a through hole portion to pass from one end portion through to the other end portion;
and wherein the second shaft member has
a through hole portion to pass from one end portion through to the other end portion, and
an outer circumference hole portion provided in a position equating to approximately the center of the direction in which the second shaft member is extended, and which passes through to the through hole of the second shaft member;
and wherein the shaft connecting member connects the through hole of the first shaft member and the through hole of the second shaft member such that the first shaft member and the second shaft member are connected in an approximate T-shape via the outer circumference hole portion provided to the second shaft member.

5. The biaxial hinge device according to claim 1,
wherein the second shaft member, having an approximately cylindrical shape, has
a hole portion which passes from one end portion through to the other end portion;
and wherein the thrust cam motion control member has
an approximately flat-shaped slide key provided to the shaft connecting member so as to be movable along the direction in which the first shaft member is extended, and
a slide control ring in an approximate ring-shape connected to an approximately cylindrical inserting portion inserted in the hole portion of the second shaft member, and to an end portion of the inserting portion having the first contact face portion and the second contact face portion on the outer circumference;
and wherein the hinge fixing portion is provided so as to be fixed to a portion protruding from the second shaft member in the event of the inserting portion of the thrust cam motion control member being inserted into the second shaft member, whereby the hinge fixing portion is provided along the outer circumference of the second shaft member so as to be turnable;
and wherein, in the event that the hinge fixing member is turned along the outer circumference of the second shaft member, the slide control ring of the thrust cam motion control member is turned, whereby
the first contact face portion or the second contact face portion of the slide control ring comes in contact with the slide key, and
the thrust cam member is moved in the connecting portion direction of the first shaft member and the second shaft member or in the direction of the arm portion by way of the slide key, by the first contact face portion or the second contact face portion of the slide control ring that comes in contact with the slide key.

6. The biaxial hinge device according to claim 5, further comprising:
- a stopper, provided to the first shaft member so as to be fixed on an end portion side which is an opposite side as to an end portion of the second shaft member;
- wherein, in the event that the stopper rotates along with the first shaft member, and the first shaft member is in a predetermined rotational angle, the stopper comes in contact with a stopper contact portion provided to the arm portion or the second housing side and restricts a rotational angle of the first shaft member to be a predetermined rotational angle.

7. The biaxial hinge device according to claim 5, wherein the hinge fixing portion has a stopper contact portion to restrict the turning of the hinge fixing portion, and
the second shaft member has a stopper, wherein
in the event that a rotational angle of the hinge fixing portion reaches a predetermined rotational angle,
  the second shaft member comes in contact with the stopper of the hinge fixing portion, and
restricts the rotational angle of the hinge fixing portion to be the predetermined rotational angle.

8. The biaxial hinge device according to claim 5, wherein the first shaft member has
- a through hole passing from one end portion through to the other end portion;
- and wherein the thrust cam motion control member inserted in the hole portion of the second shaft member has
- a through hole passing from the inserting portion through to the slide control ring;
- and wherein the shaft connecting member connects the first shaft member and the second shaft member so as to form an approximate L-shape, such that the through hole portion on the first shaft member and the through hole of the second shaft member are mutually communicating.

9. The biaxial hinge device according to claim 8, wherein the thrust cam member has
- the fitting protrusion provided to an end portion of the shaft connecting member;
- and wherein the fitting protrusion provided to the end portion of the shaft connecting member side are subjected to cutout processing to prevent wedging of a cable passed via the through hole portion of the first shaft member and the through hole portion of the thrust cam motion control member.

10. A portable terminal device comprising:
a first housing;
a second housing;
a biaxial hinge device including a rotational shaft, by which the first housing and the second housing are connected so as to enable opening in a longitudinal direction and a lateral direction, such that the first housing and second housing can be approximately orthogonal to one another, the biaxial hinge device further including
an approximately rod-shaped first shaft member,
an approximately rod-shaped second shaft member,
a shaft connecting member for connecting the first shaft member and the second shaft member such that the direction in which the first shaft member extends and the direction in which the second shaft member extends are approximately orthogonal,
an arm portion provided to the first shaft member so as to be turnable along the outer circumference of the first shaft member, the arm portion further including
  a fixing portion for fixation to the first housing, and
  a fitting recess provided along the direction in which the first shaft member extends;
a hinge fixing portion for fixation to the second housing, provided to the second shaft member so as to be turnable along the outer circumference of the second shaft member;
a thrust cam member provided to the first shaft member such that movement in the direction in which the first shaft member extends is enabled, the thrust cam member further including
  a fitting protrusion, provided at the end portion thereof toward the arm portion, for fitting into the fitting recess of the arm portion;
a spring member configured to press the thrust cam member in the direction of the second shaft member; and
a thrust cam motion control member including
  a first contact face portion, for moving the thrust cam member in the direction of the shaft connecting member; and
  a second contact face portion, for moving the thrust cam member in the direction of the arm portion,
  motion taking place by the first contact face portion and the second contact face portion directly or indirectly coming into contact with the thrust cam member;
wherein, in the event that the first housing and the second housing are in a closed state, the thrust cam member is moved in the direction of the shaft connecting member according to pressing force by the spring member with the first contact face portion, and the fitting protrusion of the thrust cam member and the fitting recess of the arm portion are disengaged from fitting, whereby each housing can turn supported by the first shaft member as a rotational shaft and together each housing can turn supported by the second shaft member as a rotational shaft, and in a case of turning supported by the second shaft member as a rotational shaft, the thrust cam member is moved in the direction of the arm portion so as to press against the pressing force of the spring member, whereby the fitting protrusion of the thrust cam member is fitted into the fitting recesses of the arm portion, and the turning angle of each housing supported by the second shaft member as a rotational shaft is restricted to a predetermined turning angle.

* * * * *